United States Patent [19]
Cathey, Jr. et al.

[11] Patent Number: 5,748,371
[45] Date of Patent: May 5, 1998

[54] EXTENDED DEPTH OF FIELD OPTICAL SYSTEMS

[75] Inventors: Wade Thomas Cathey, Jr., Boulder; Edward Raymond Dowski, Jr., Lafayette, both of Colo.

[73] Assignee: The Regents of the University of Colorado, Boulder, Colo.

[21] Appl. No.: 823,894

[22] Filed: Mar. 17, 1997

Related U.S. Application Data

[63] Continuation of Ser. No. 384,257, Feb. 3, 1995, abandoned.

[51] Int. Cl.$^6$ .................................................. G02B 5/18
[52] U.S. Cl. ........................... 359/558; 356/3; 382/254
[58] Field of Search .............................. 359/559, 724, 359/558, 563, 564; 356/124.5, 3; 382/210, 211, 212, 213, 254, 255

[56] References Cited

U.S. PATENT DOCUMENTS

| | | | |
|---|---|---|---|
| 3,614,310 | 10/1971 | Korpel | 178/6.8 |
| 4,082,431 | 4/1978 | Ward, III | 382/210 |
| 4,275,454 | 6/1981 | Klooster, Jr. | 359/559 |
| 4,308,521 | 12/1981 | Casasent et al. | 364/515 |
| 4,804,249 | 2/1989 | Reynolds et al. | 359/558 |
| 5,003,166 | 3/1991 | Girod | 382/255 |
| 5,142,413 | 8/1992 | Kelly | 359/559 |
| 5,307,175 | 4/1994 | Seachman | 358/401 |
| 5,426,521 | 6/1995 | Chen et al. | 359/559 |

OTHER PUBLICATIONS

J.T. McCrickerd, "Coherent Processing and Depth of Focus of Annular Aperture Imagery", *Applied Optics*, vol. 10, No. 10, Oct., 1971 pp. 2226–2229.

Applied Optics Article Entitled "Improvement in the OTF of a Defocused Optical System Through the Use of Shaded Apertures" By M. Mino et al, vol. 10, No. 10, pp. 2219–2225, Oct. 1971.

Applied Optics Article Entitled "High Focal Depth by Apodization and Digital Restoration" By J. Ojeda–Castaneda et al., vol. 27, No. 12, pp. 2583–2586, Jun. 1988.

Applied Optics Article Entitled "Zone Plate for Arbitrarily High Focal Depth" By J. Ojeda–Castaneda et al, vol. 29, No. 7, pp. 994–997, Mar. 1990.

*Primary Examiner*—Paul M. Dzerzynski
*Assistant Examiner*—John Juba, Jr.
*Attorney, Agent, or Firm*—F. A. Sirr; E. C. Hancock; Holland & Hart llp

[57] ABSTRACT

A system for increasing the depth of field and decreasing the wavelength sensitivity and the effects of misfocus-producing aberrations of the lens of an incoherent optical system incorporates a special purpose optical mask into the incoherent system. The optical mask has been designed to cause the optical transfer function to remain essentially constant within some range from the in-focus position. Signal processing of the resulting intermediate image undoes the optical transfer modifying effects of the mask, resulting in an in-focus image over an increased depth of field. Generally the mask is placed at a principal plane or the image of a principal plane of the optical system. Preferably, the mask modifies only phase and not amplitude of light. The mask may be used to increase the useful range of passive ranging systems.

21 Claims, 33 Drawing Sheets

EXTENDED DEPTH OF FIELD OPTICAL SYSTEMS

CROSS-REFERENCE TO RELATED APPLICATIONS

This application is a continuation of patent application Ser. No. 08/384,257, filed Feb. 3, 1995, for Extended Depth of Field Optical Systems now abandoned.

U.S. patent application Ser. No. 08/083,829, filed Jun. 25, 1993 and entitled "Range Estimation Apparatus and Method", is incorporated herein by reference now U.S. Pat. No. 5,521,695. +gi This invention was made with Government support awarded by the National Science Foundation and the Office of Naval Research. The Government has certain rights in this invention.

BACKGROUND OF THE INVENTION

1. Field of the Invention

This invention relates to apparatus and methods for increasing the depth of field and decreasing the wavelength sensitivity of incoherent optical systems. This invention is particularly useful for increasing the useful range of passive ranging systems. The same techniques are applicable to passive acoustical and electromagnetic ranging systems.

2. Description of the Prior Art

Improving the depth of field of optical systems has long been a goal of those working with imaging systems. Complicated lens systems are capable of greatly expanding the depth of field achievable, but are very expensive. A need remains in the art for a simple imaging system, with one or only a few lenses, which none the less provides greatly expanded depth of field focusing. The increased depth of field also reduces the misfocus that occurs as a function of wavelength. Depth of field refers to the depth in the scene being imaged. Depth of focus refers to the depth in the image recording system.

Another drawback of simple optical systems is that the images formed with red light focus in a different plane from the images formed with blue or green light. There is only a narrow band of wavelengths in focus at one plane; the other wavelengths are out of focus. This is called chromatic aberration. Currently, extending the band of wavelengths that form an in-focus image is accomplished by using two or more lenses with different indices of refraction to form what is called an achromatic lens. By extending the depth of field of the system, the regions would extended where each wavelength forms an in-focus image. If these regions can be made to overlap, the system, after digital processing, can produce (for example) a high resolution image at the three different color bands of a television camera. The extended depth of focus system can, of course, be combined with an achromatic lens to provide even better performance.

There are several other aberrations that result in misfocus. Another example is astigmatism. This occurs when vertical lines and horizontal lines, for example, focus in different planes. The extended depth of focus system will produce overlapping focal regions so that astigmatism can be reduced or eliminated. Another example of an aberration that can be corrected or partially corrected is spherical aberration, where different zones of the lens focus to different planes.

The effects of any aberration that causes a misfocus are reduced by the extended depth of focus system. This gives much greater flexibility in the "balancing" of aberrations done by the lens designer. The use of optical masks to improve image quality is also a popular field of exploration. For example, "Improvement in the OTF of a Defocussed Optical System Through the Use of Shaded Apertures", by M. Mino and Y. Okano, *Applied Optics*, Vol. 10 No. 10, October 1971, discusses decreasing the amplitude transmittance gradually from the center of a pupil towards its rim to produce a slightly better image. "High Focal Depth By Apodization and Digital Restoration" by J. Ojeda-Castaneda et al, *Applied Optics*, Vol. 27 No. 12, June 1988, discusses the use of an iterative digital restoration algorithm to improve the optical transfer function of a previously apodized optical system. "Zone Plate for Arbitrarily High Focal Depth" by J. Ojeda-Castaneda et al, *Applied Optics*, Vol. 29 No. 7, March 1990, discusses use of a zone plate as an apodizer to increase focal depth.

All of these inventors, as well as all of the others in the field, are attempting to do the impossible: achieve the point spread function of a standard, in-focus optical system along with a large depth of field by purely optical means. When digital processing has been employed, it has been used to try to slightly clean up and sharpen an image after the fact.

SUMMARY OF THE INVENTION

The systems described herein give in-focus resolution over the entire region of the extended depth of focus. Thus it is especially useful for compensating for misfocus aberrations such as the astigmatism and spherical aberration problems.

An object of the present invention is to increase depth of field in an incoherent optical imaging system by adding a special purpose optical mask to the system that has been designed to make it possible for digital processing to produce an image with in-focus resolution over a large range of misfocus by digitally processing the resulting intermediate image. The mask causes the optical transfer function to remain essentially constant within some range away from the in-focus position. The digital processing undoes the optical transfer function modifying effects of the mask, resulting in the high resolution of an in-focus image over an increased depth of field.

A general incoherent optical system includes a lens for focussing light from an object into an intermediate image, and means for storing the image, such as film, a video camera, or a Charge Coupled Device (CCD) or the like. The depth of field of such an optical system is increased by inserting an optical mask between the object and the CCD. The mask modifies the optical transfer function of the system such that the optical transfer function is substantially insensitive to the distance between the object and the lens, over some range of distances. Depth of field post-processing is done on the stored image to restore the image by reversing the optical transfer alteration accomplished by the mask. For example, the post-processing means implements a filter which is the inverse of the alteration of the optical transfer function accomplished by the mask.

In general, the mask is located either at a principal plane of the optical system or at an image of a principal plane. The mask must be placed in a location of the optical system such that the resulting system is a linear system. Placing the mask at the principal plane or an image of a principal plane has this result. Preferably, the mask is a phase mask, altering only the phase and not the amplitude of the light. For example, the mask could be a cubic phase modulation mask.

A mask for extending the depth of field of an optical system may be constructed by examining the ambiguity functions of several candidate mask functions to determine which particular mask function has an optical transfer function which is closest to constant over a range of object distances and manufacturing a mask having the mask function of that particular candidate.

A second object of the invention is to increase the useful range of passive ranging systems. To accomplish this object, the mask modifies the optical transfer function to be object distance insensitive as above, and also encodes distance information into the image by modifying the optical system such that the optical transfer function contains zeroes as a function of object range. Ranging post-processing means connected to the depth of field post-processing means decodes the distance information encoded into the image and from the distance information computes the range to various points within the object. For example, the mask could be a combined cubic phase modulation and linear phase modulation mask.

A third object of this invention is to extend the band of wavelengths (colors) that form an in-focus image. By extending the depth of field of the system, the regions are extended where each wavelength forms an in-focus image. These regions can be made to overlap and the system, after digital processing, can produce a high resolution image at the three different color bands.

Those having normal skill in the art will recognize the foregoing and other objects, features, advantages and applications of the present invention from the following more detailed description of the preferred embodiments as illustrated in the accompanying drawings.

DETAILED DESCRIPTION OF THE PREFERRED EMBODIMENTS

Figure 1:
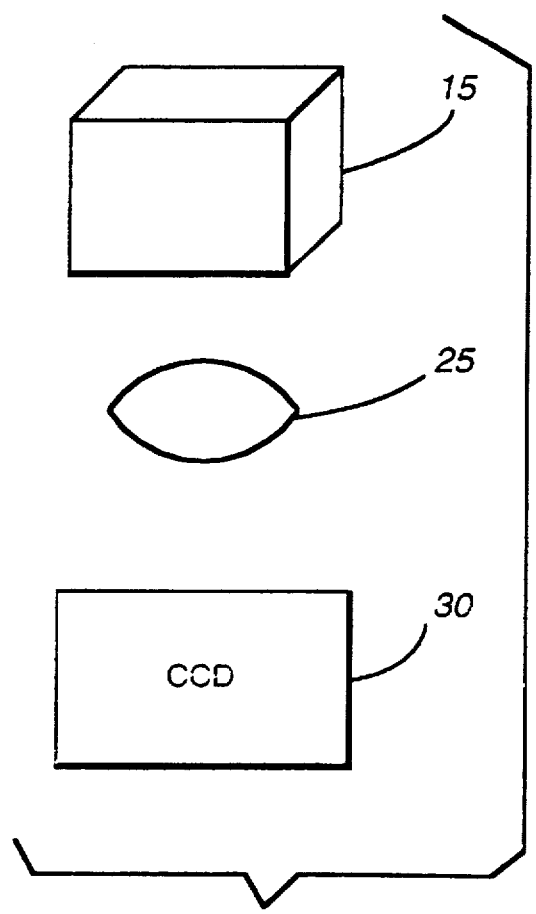
FIG. 1 shows a standard prior art imaging system.

FIG. 1 (prior art) shows a standard optical imaging system. Object 15 is imaged through lens 25 onto Charge Coupled Device (CCD) 30. Of course, more lenses or a different recording medium could be used, but FIG. 1 shows a simple standard optical system. Such a system creates a sharp, in-focus image at CCD 30 only if object 15 is located at or very close to the in-focus object plane. If the distance from the back principal plane of lens 25 to CCD 30 is $d_i$, and the focal length of lens 25 is f, the distance from the front principal plane of lens 25 to object 15, $d_o$ must be chosen such that:

$$\frac{1}{d_0} + \frac{1}{d_i} - \frac{1}{f} = 0$$

in order for the image at CCD 30 to be in-focus. The depth of field of an optical system is the distance the object can move away from the in-focus distance and still have the image be in focus. For a simple system like FIG. 1, the depth of focus is very small.

Figure 2:
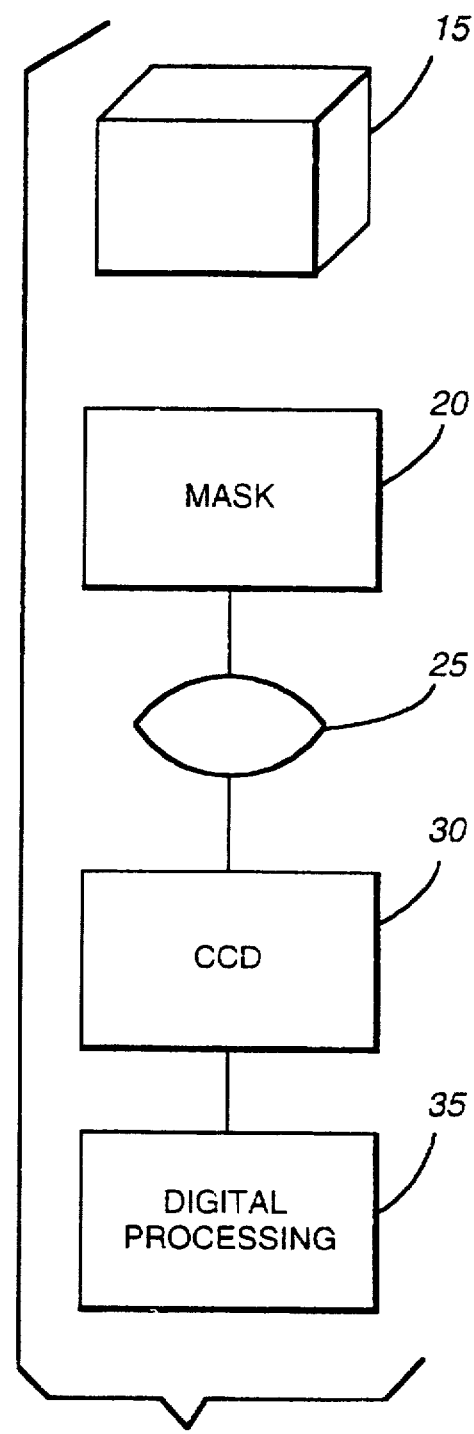
FIG. 2 shows an Extended Depth of Field (EDF) imaging system in accordance with the present invention.

FIG. 2 shows the interaction and operation of a multi-component extended depth of field system in accordance with the invention. Object 15 is imaged through optical mask 20 and lens 25 onto Charge Coupled Device (CCD) system 30, and image post-processing is performed by digital processing system 35. Those skilled in the art will appreciate that any image recording and retrieval device could be used in place of CCD system 30.

Mask 20 is composed of an optical material, such as glass or plastic film, having variations in opaqueness, thickness, or index of refraction. Mask 20 preferably is a phase mask, affecting only the phase of the light transmitted and not its amplitude. This results in a high efficiency optical system. However, mask 20 may also be an amplitude mask or a combination of the two. Mask 20 is designed to alter an incoherent optical system in such a way that the system response to a point object, or the Point Spread Function (PSF), is relatively insensitive to the distance of the point from the lens 25, over a predetermined range of object distances. Thus, the Optical Transfer Function (OTF) is also relatively insensitive to object distance over this range. The resulting PSF is not itself a point. But, so long as the OTF does not contain any zeroes, image post processing may be used to correct the PSF and OTF such that the resulting PSF is nearly identical to the in-focus response of a standard optical system over the entire predetermined range of object distances.

The object of mask 20 is to modify the optical system in such a way that the OTF of the FIG. 2 system is unaffected by the misfocus distance over a particular range of object distances. In addition, the OTF should not contain zeroes, so that the effects of the mask (other than the increased depth of field) can be removed in post-processing.

A useful method of describing the optical mask function P(x) (P(x) is described in conjunction with FIGS. 3–30 below) is the ambiguity function method. It happens that the OTF equation for an optical system can be put in a form similar to the well known ambiguity function A(u,v). The ambiguity function is used in radar applications and has been extensively studied. The use and interpretation of the ambiguity function for radar systems are completely different from the OTF, but the similarity in the form of the equations helps in working with the OTF. The ambiguity function is given by:

$$A(u,v) = \int \hat{P}(x+u/2)\hat{P}^*(x-u/2)e^{j2\pi xv}dv$$

where * denotes complex conjugate and where the mask function $\hat{P}(x)$ is in normalized coordinates:

$$\hat{P}(x) = P(xD/2\pi),$$

$$\hat{P}(x) = 0, |x| > \pi$$

with D being the length of the one-dimensional mask. The above assumes two dimensional rectangularly separable masks for simplicity. Such systems theoretically can be completely described by a one dimensional mask.

As is known to those skilled in the art, given a general optical mask function P(x), one can calculate the response of the incoherent OTF to any value of misfocus Ψ by the equation:

$$H(u, \Psi) = \int \hat{P}(x+u/2)e^{j(x+u/2)^2\Psi}\hat{P}^*(x-u/2)e^{-j(x-u/2)^2\Psi}dx$$

The independent spatial parameter x and spatial frequency parameter u are unitless because the equation has been normalized.

Ψ is a normalized misfocus parameter dependent on the size of lens 25 and the focus state:

$$\psi = \frac{L^2}{4\pi\lambda}\left(\frac{1}{f} - \frac{1}{d_0} - \frac{1}{d_i}\right)$$

Where L is the length of the lens, λ is the wavelength of the light, f is the focal length of lens 25, $d_o$ is the distance from the front principal plane to the object 15, and $d_i$ is the distance from the rear principal plane to the image plane, located at CCD 30. Given fixed optical system parameters, misfocus Ψ is monotonically related to object distance $d_o$.

It can be shown that the OTF and the ambiguity function are related as:

$$H(u,\Psi) = A(u,u\Psi/\pi)$$

Therefore, the OTF is given by a radial slice through the ambiguity function A(u,v) that pertains to the optical mask function $\hat{P}(x)$. This radial line has a slope of Ψ/π. The process of finding the OTF from the ambiguity function is shown in FIGS. 4–8. The power and utility of the relationship between the OTF and the ambiguity function lie in the fact that a single two dimensional function, A(u,v), which depends uniquely on the optical mask function $\hat{P}(x)$, can represent the OTF for all values of misfocus. Without this tool, it would be necessary to calculate a different OTF function for each value of misfocus, making it difficult to determine whether the OTF is essentially constant over a range of object distances.

Figure 3:
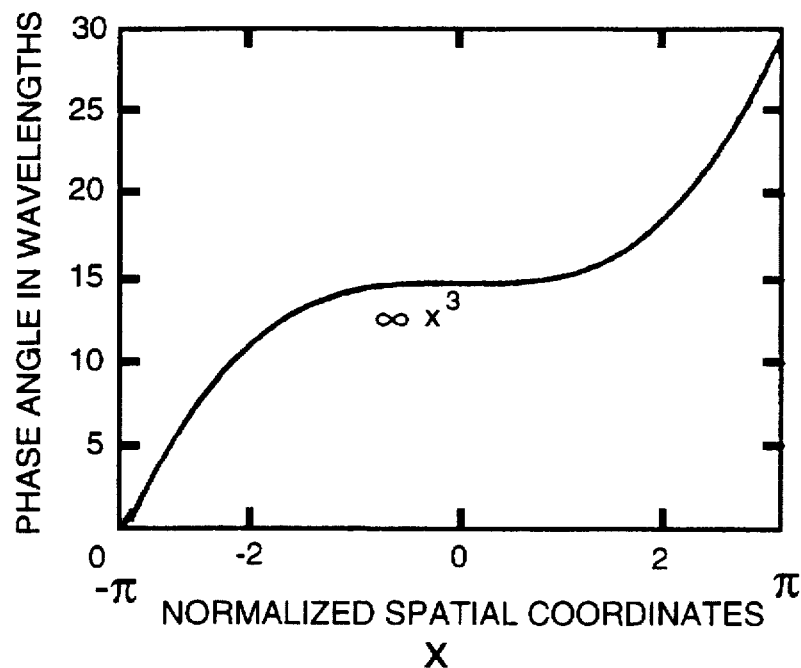
FIG. 3 shows a mask profile for a Cubic-PM (C-PM) mask used in FIG. 2.

FIG. 3 shows the mask function of a mask implementing a cubic phase function, called a Cubic Phase Modulation (cubic-PM) mask. The cubic-PM mask function is given by:

$$\hat{P}(x) = e^{j\alpha x^3}, |x| \leq \pi$$

where α is a parameter used to adjust the amount of depth of field increase. When α=0, the mask function is the standard rectangular function given by no mask or by a transparent mask. As the absolute value of α increases, the depth of field increases. The image contrast before post-processing also decreases as α increases. This is because as α increases, the ambiguity function broadens, so that it is less sensitive to misfocus. But, since the total volume of the ambiguity function stays constant, the ambiguity function flattens out as it widens.

For large enough α, the OTF of a system using a cubic PM mask can be approximated by:

$$H(u,\psi) \approx \sqrt{\frac{\pi}{3|\alpha u|}} \; e^{-j\frac{\alpha u^3}{4}}, u \neq 0$$

$$H(u,\psi) \approx 2, u = 0$$

Appendix A gives the mathematics necessary to arrive at the above OTF function.

Thus, the cubic-PM mask is an example of a mask which modifies the optical system to have a near-constant OTF over a range of object distances. The particular range for which the OTF does not vary much is dependent of α. The range (and thus the depth of field) increases with α. However, the amount that depth of field can be increased is practically limited by the fact that contrast decreases as α increases, and eventually contrast will go below the system noise.

FIGS. 4 through 30 compare and contrast the performance of the standard imaging system of FIG. 1 and a preferred embodiment of the extended depth of field system of FIG. 2, which utilizes the C-PM mask of FIG. 3.

In the following description, the systems of FIG. 1 and FIG. 2 are examined using three methods. First, the magnitude of the OTFs of the two systems are examined for various values of misfocus. The magnitude of the OTF of a system does not completely describe the quality of the final image. Comparison of the ideal OTF (the standard system of FIG. 1 when in focus) with the OTF under other circumstance gives a qualitative feel for how good the system is.

Second, the PSFs of the two systems are compared. The full width at half maximum amplitude of the PSFs gives a quantitative value for comparing the two systems. Third, images of a spoke picture formed by the two systems are compared. The spoke picture is easily recognizable and contains a large range of spatial frequencies. This comparison is quite accurate, although it is qualitative.

Figure 4:
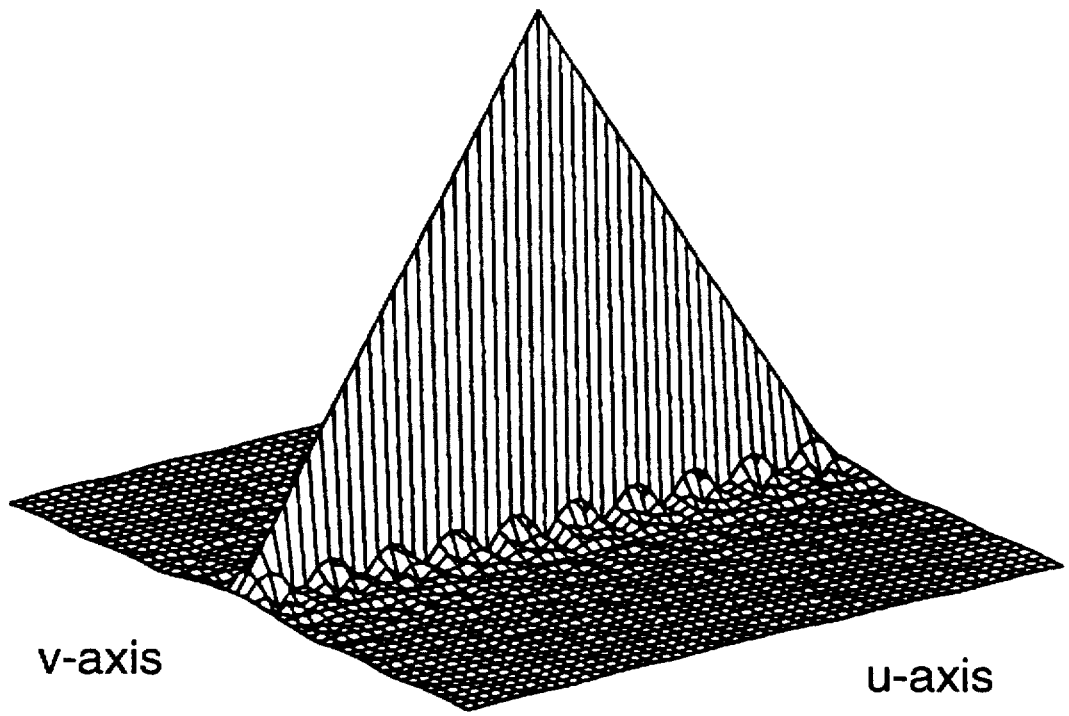
FIG. 4 shows the ambiguity function of the standard system of FIG. 1.
Figure 5:
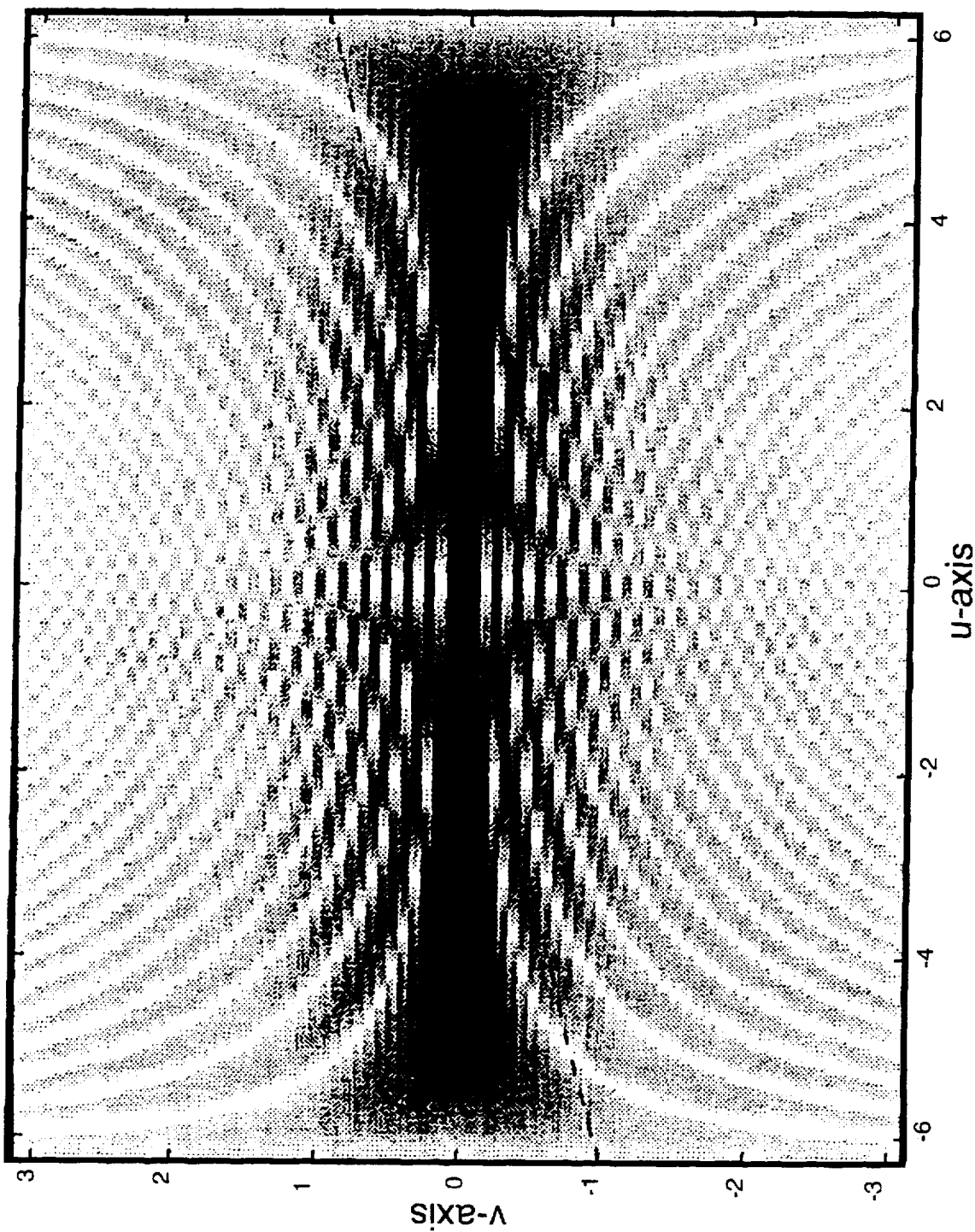
FIG. 5 shows a top view of the ambiguity function of FIG. 4.

FIG. 4 shows the ambiguity function of the standard optical system of FIG. 1. Most of the power is concentrated along the v=0 axis, making the system very sensitive to misfocus. FIG. 5 is the top view of FIG. 4. Large values of the ambiguity function are represented by dark shades in this figure. The horizontal axis extends from −2π to 2π. As discussed above, the projection of a radial line drawn through the ambiguity function with slope Ψ/π determines the OTF for misfocus Ψ. This radial line is projected onto the spatial frequency u axis. For example, the dotted line on FIG. 5 was drawn with a slope of 1/(2π). This line corresponds to the OTF of the standard system of FIG. 1 for a misfocus value of Ψ=½. The magnitude of this OTF is shown in FIG. 7.

Figure 6:
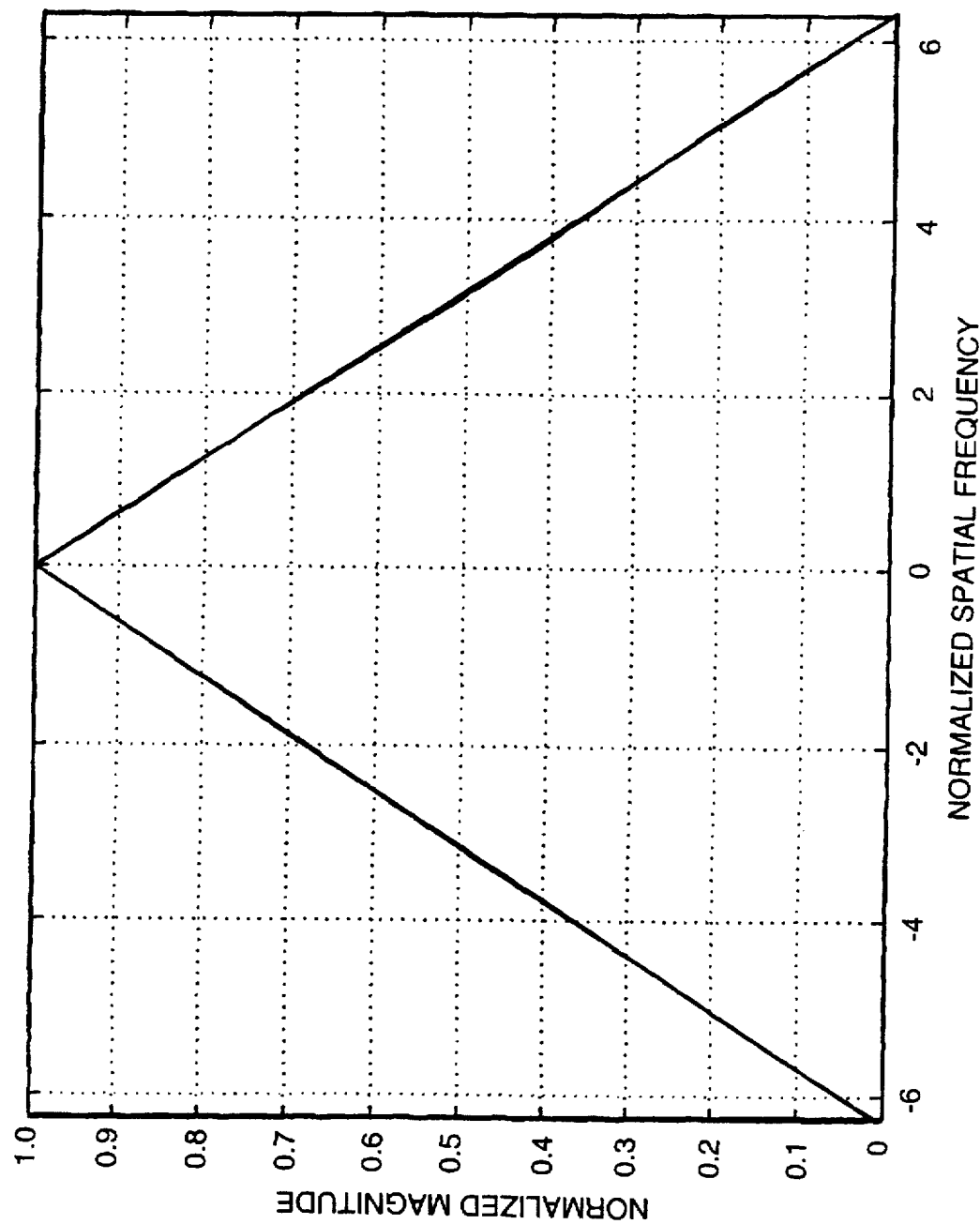
FIG. 6 shows the OTF for the standard FIG. 1 system with no misfocus.

FIG. 6 shows the magnitude of the OTF of the standard system of FIG. 1 with no misfocus. This plot corresponds to the radial line drawn horizontally along the horizontal u axis in FIG. 5.

Figure 7:
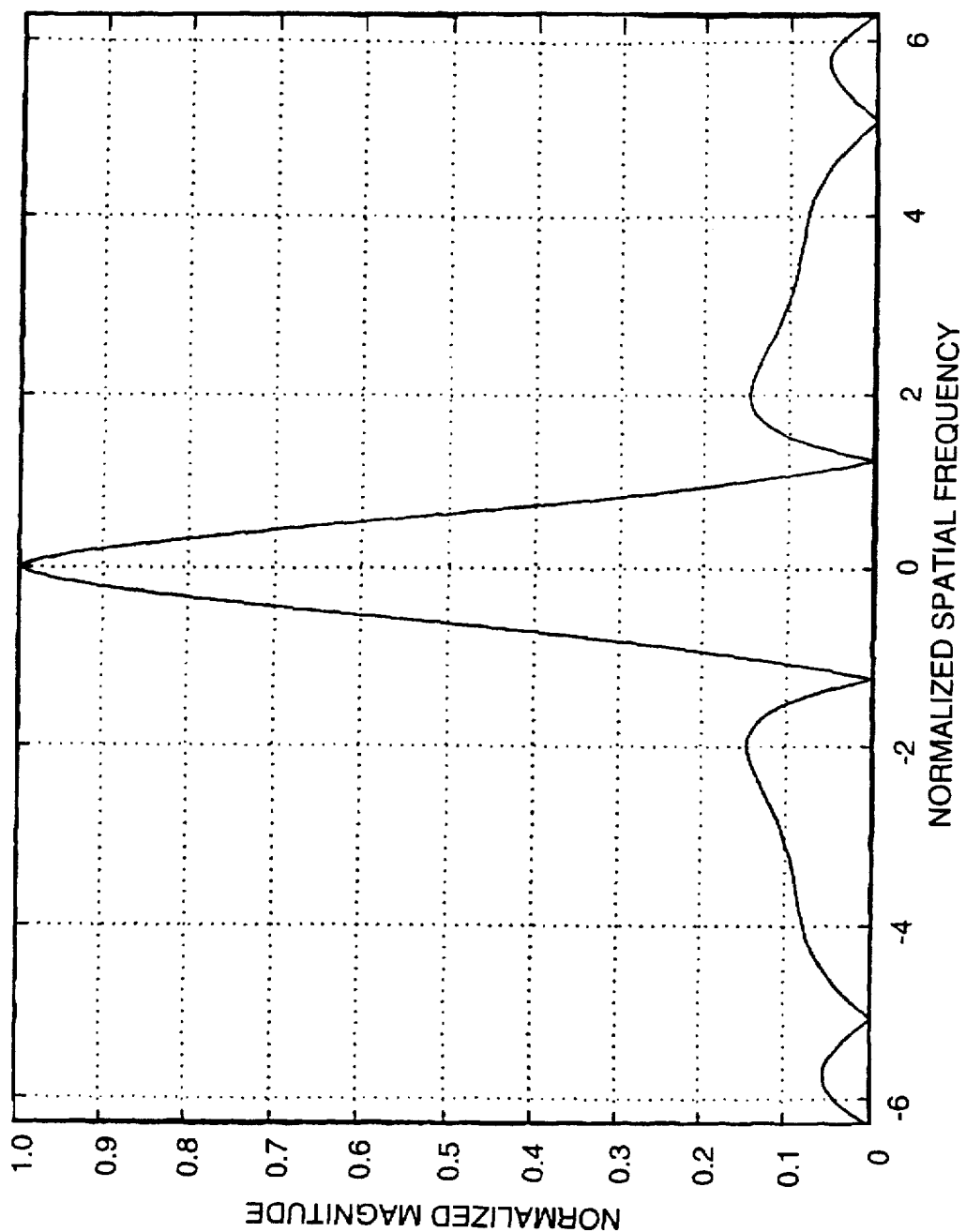
FIG. 7 shows the OTF for the standard FIG. 1 system with mild misfocus.

FIG. 7 shows the magnitude of the OTF for a relatively mild misfocus value of ½. This OTF corresponds to the dotted line in FIG. 5. Even for a misfocus of ½, this OTF is dramatically different from the OTF of the in-focus system, shown in FIG. 6.

Figure 8:
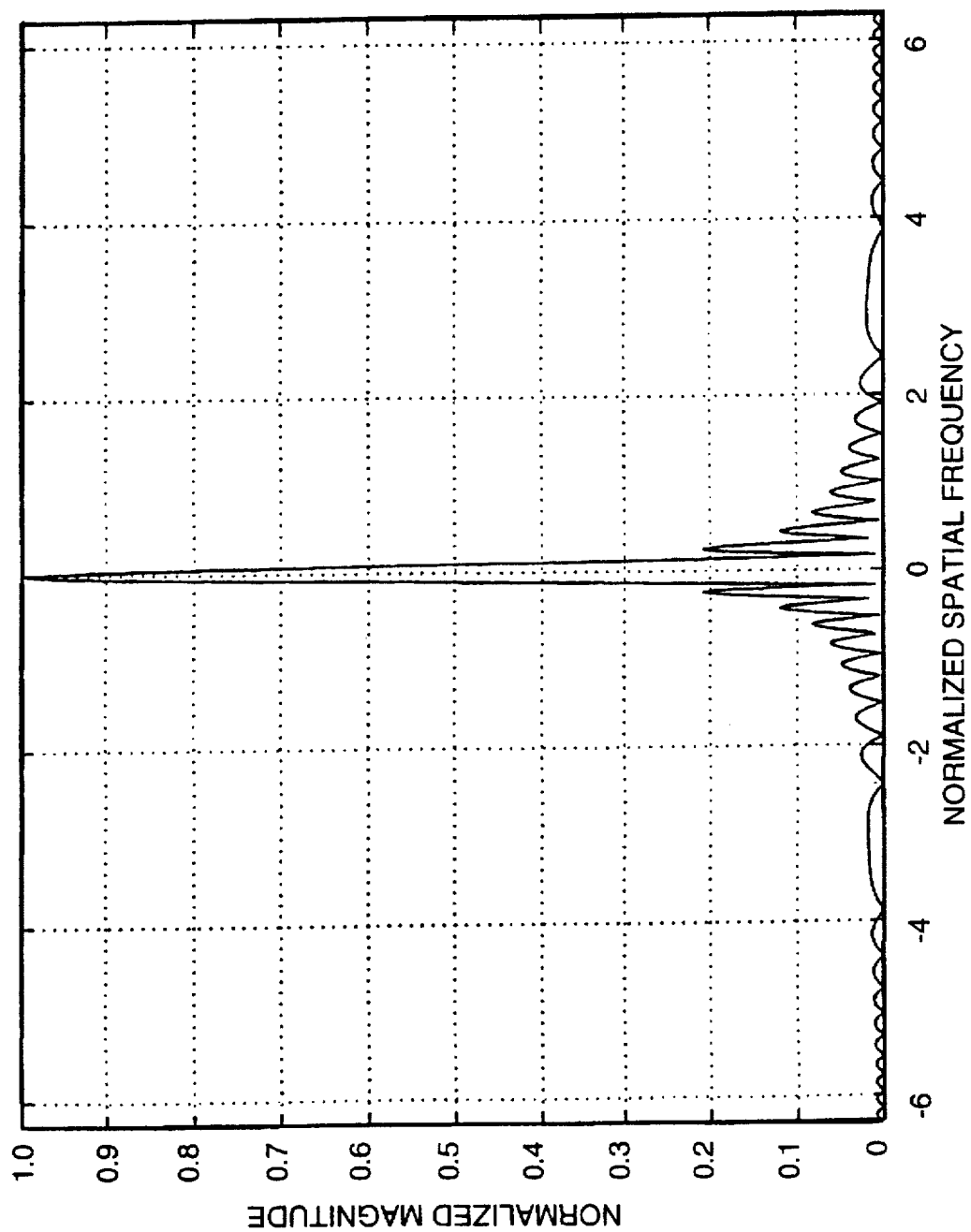
FIG. 8 shows the Optical Transfer Function for the standard FIG. 1 system with large misfocus.

FIG. 8 shows the magnitude of the OTF for a rather large misfocus value of Ψ=3. It bears very little resemblance to the in-focus OTF of FIG. 6.

Figure 9:
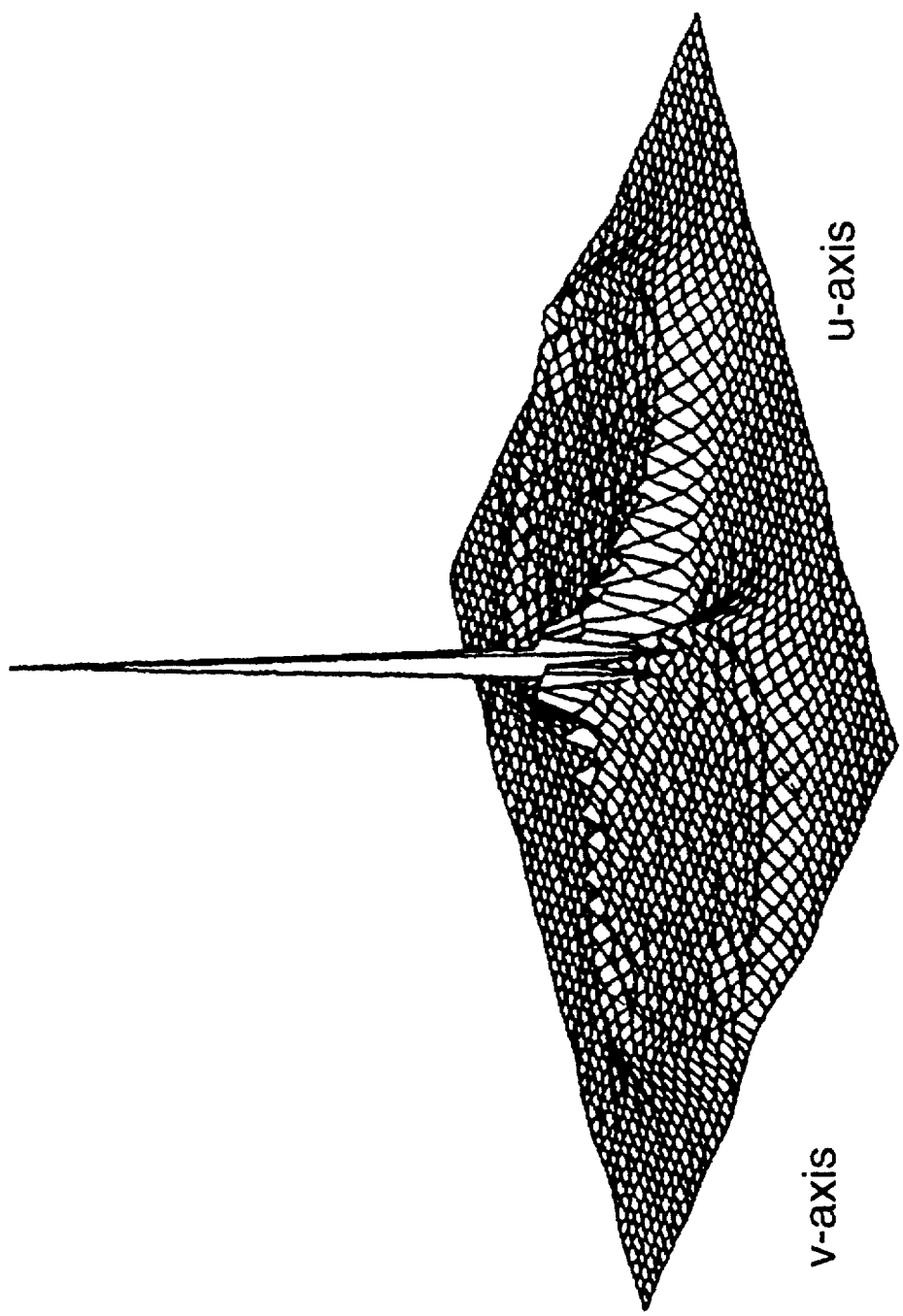
FIG. 9 shows the ambiguity function of the C-PM mask of FIG. 3.

FIG. 9 shows the ambiguity function of the extended depth of field system of FIG. 2 utilizing the C-PM mask of FIG. 3 (the C-PM system). This ambiguity function is relatively flat, so that changes in misfocus produce little change in the system OTF. α, defined on page 12, is set equal to three for this particular system, designated "the C-PM system" herein.

Figure 10:
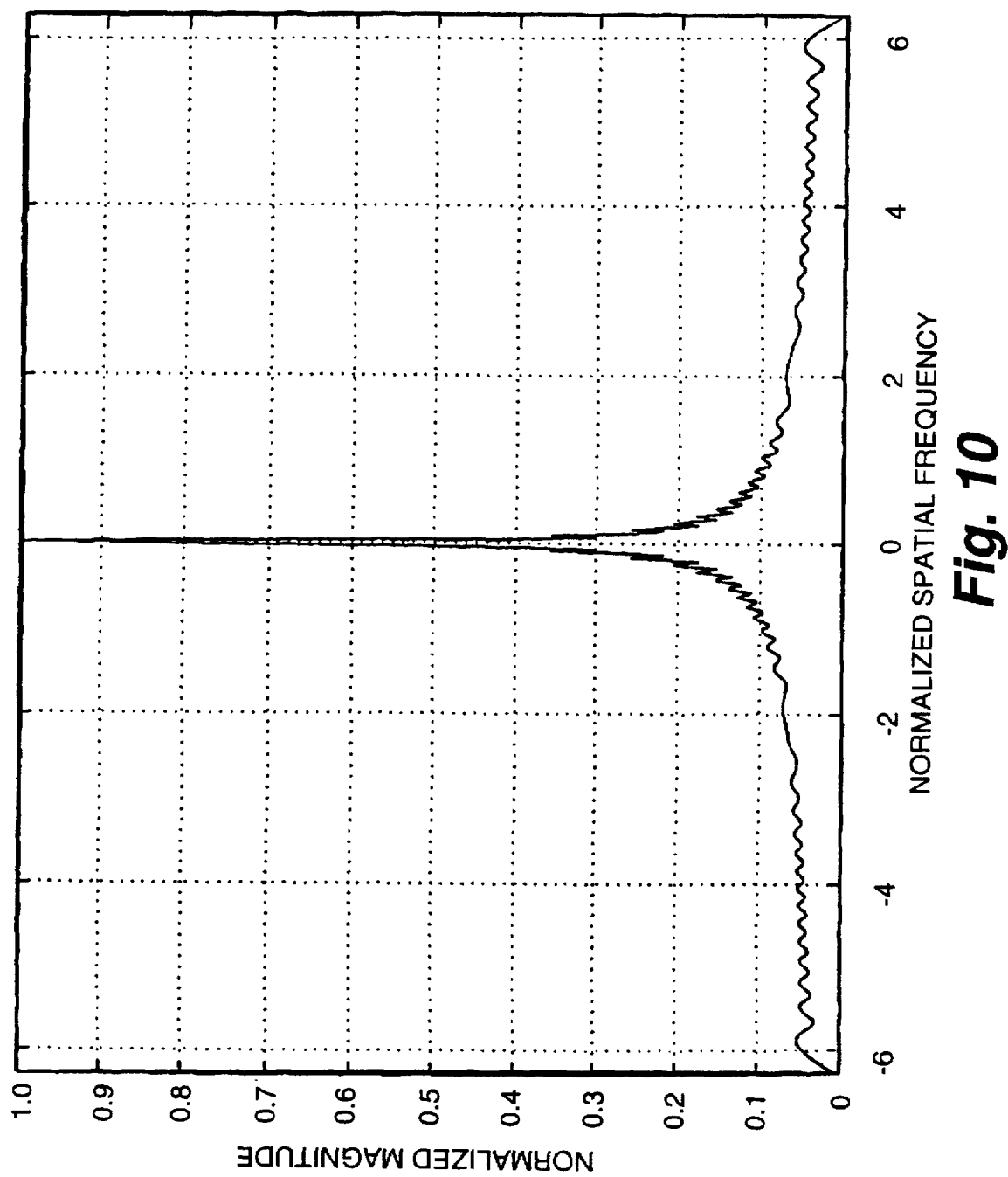
FIG. 10 shows the OTF of the extended depth of field system of FIG. 2, with the C-PM mask of FIG. 3, with no misfocus and before digital processing.
Figure 11:
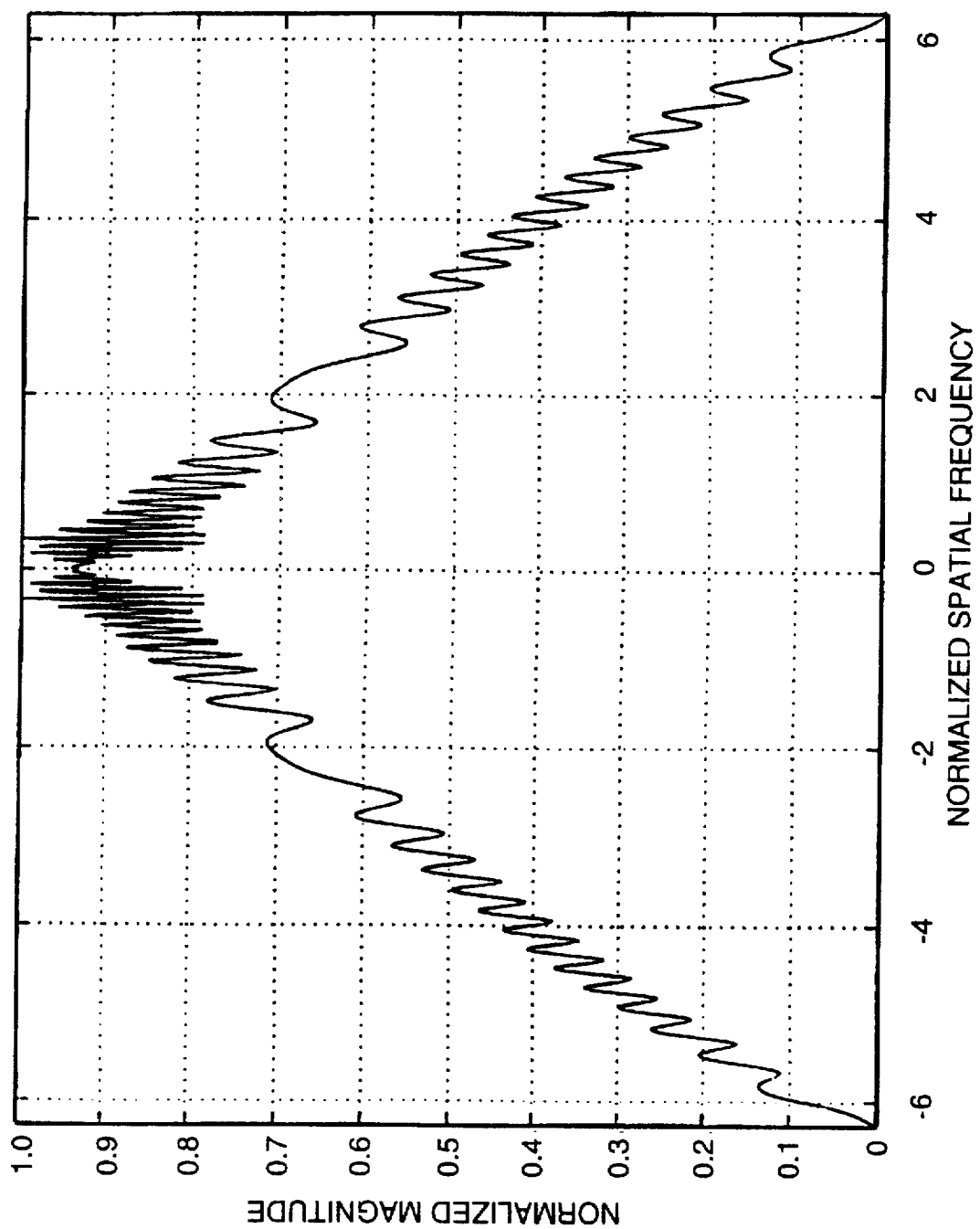
FIG. 11 shows the OTF of the C-PM system of FIG. 2 with no misfocus, after processing.

FIG. 10 shows the magnitude of the OTF of the C-PM system of FIG. 2 before digital filtering is done. This OTF does not look much like the ideal OTF of FIG. 6. However, the OTF of the entire C-PM EDF system (which includes filtering) shown in FIG. 11 is quite similar to FIG. 6. The high frequency ripples do not affect output image quality much, and can be reduced in size by increasing α.

Figure 12:
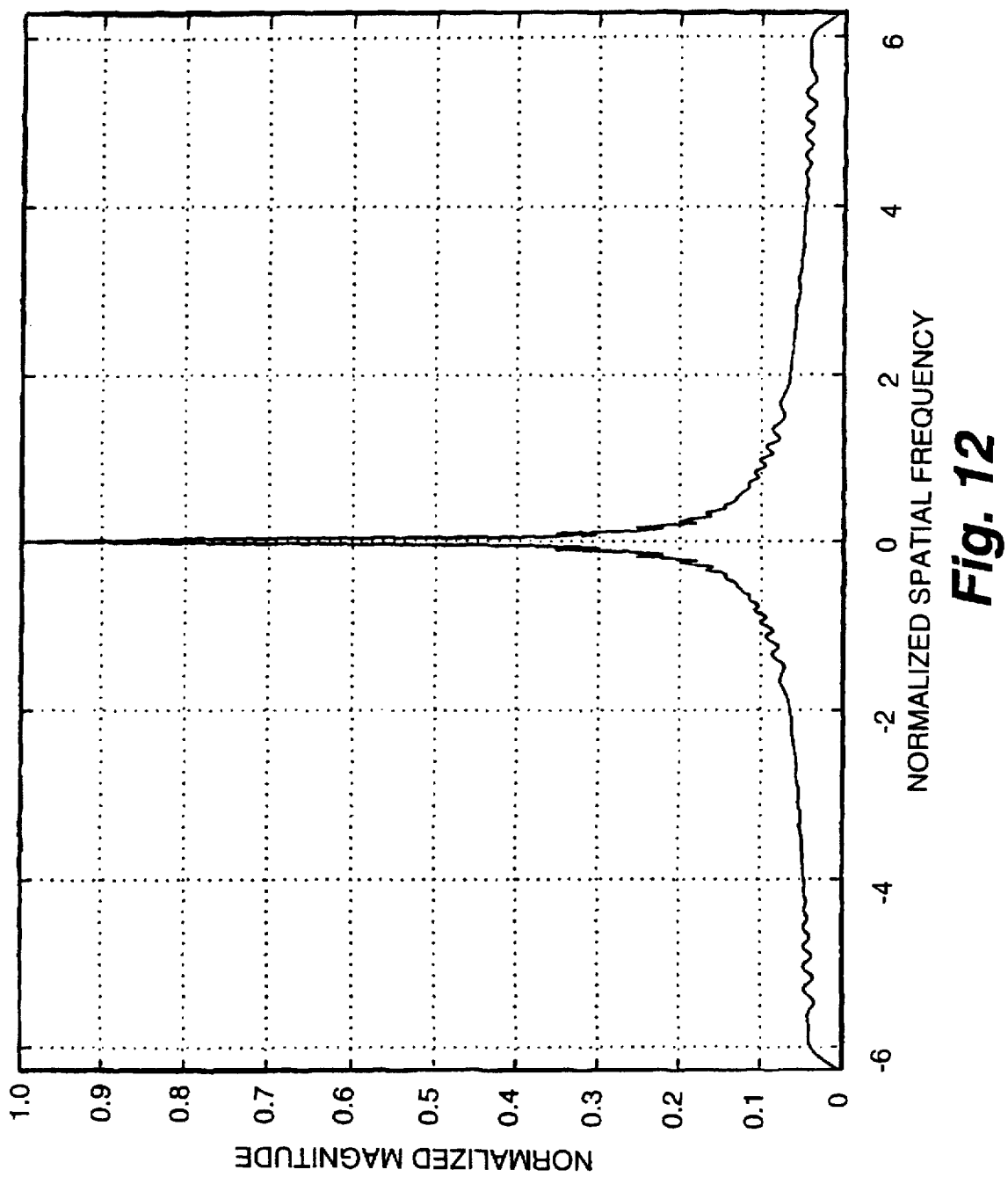
FIG. 12 shows the OTF of the C-PM system of FIG. 2 with mild misfocus (before processing).
Figure 13:
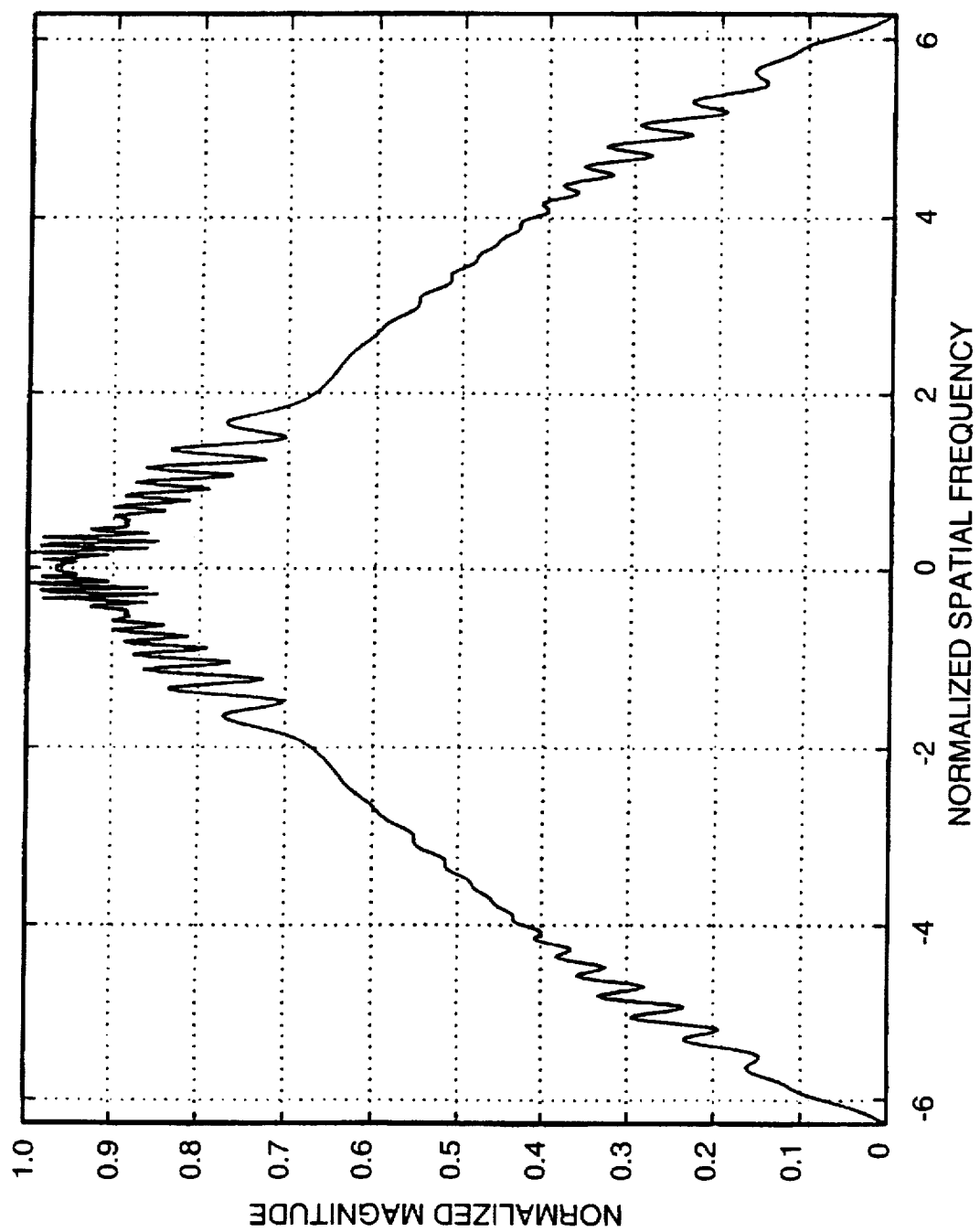
FIG. 13 shows the OTF of the C-PM system of FIG. 2 with mild misfocus (after processing).

FIG. 12 shows the magnitude of the OTF of the C-PM system of FIG. 2 with mild misfocus (Ψ=½), before filtering. Again, this OTF doesn't look like FIG. 6. It does, however look like FIG. 10, the OTF for no misfocus. Thus, the same filter produces the final OTF shown in FIG. 13, which does resemble FIG. 6.

Figure 14:
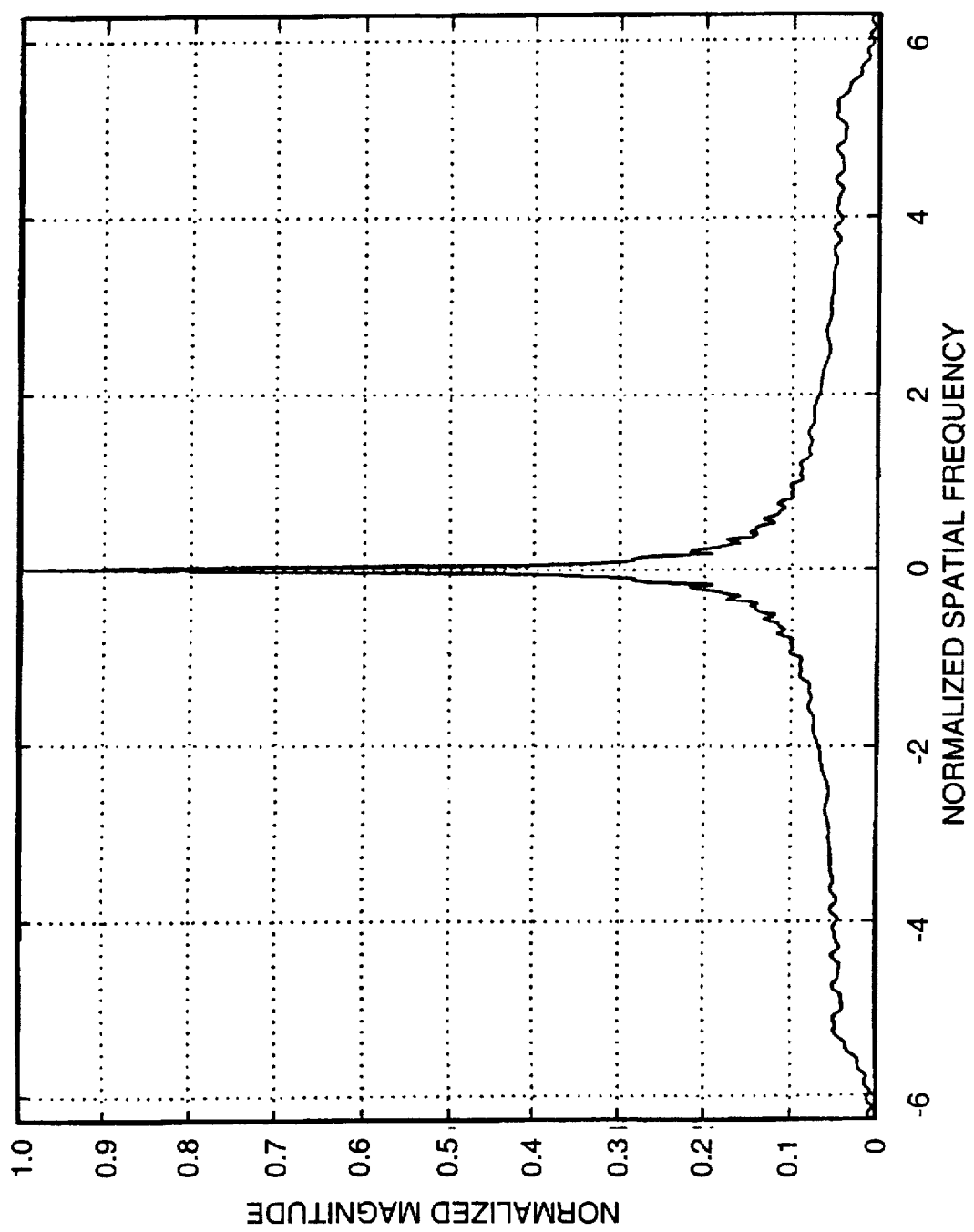
FIG. 14 shows the OTF of the C-PM system of FIG. 2 with large misfocus (before processing).
Figure 15:
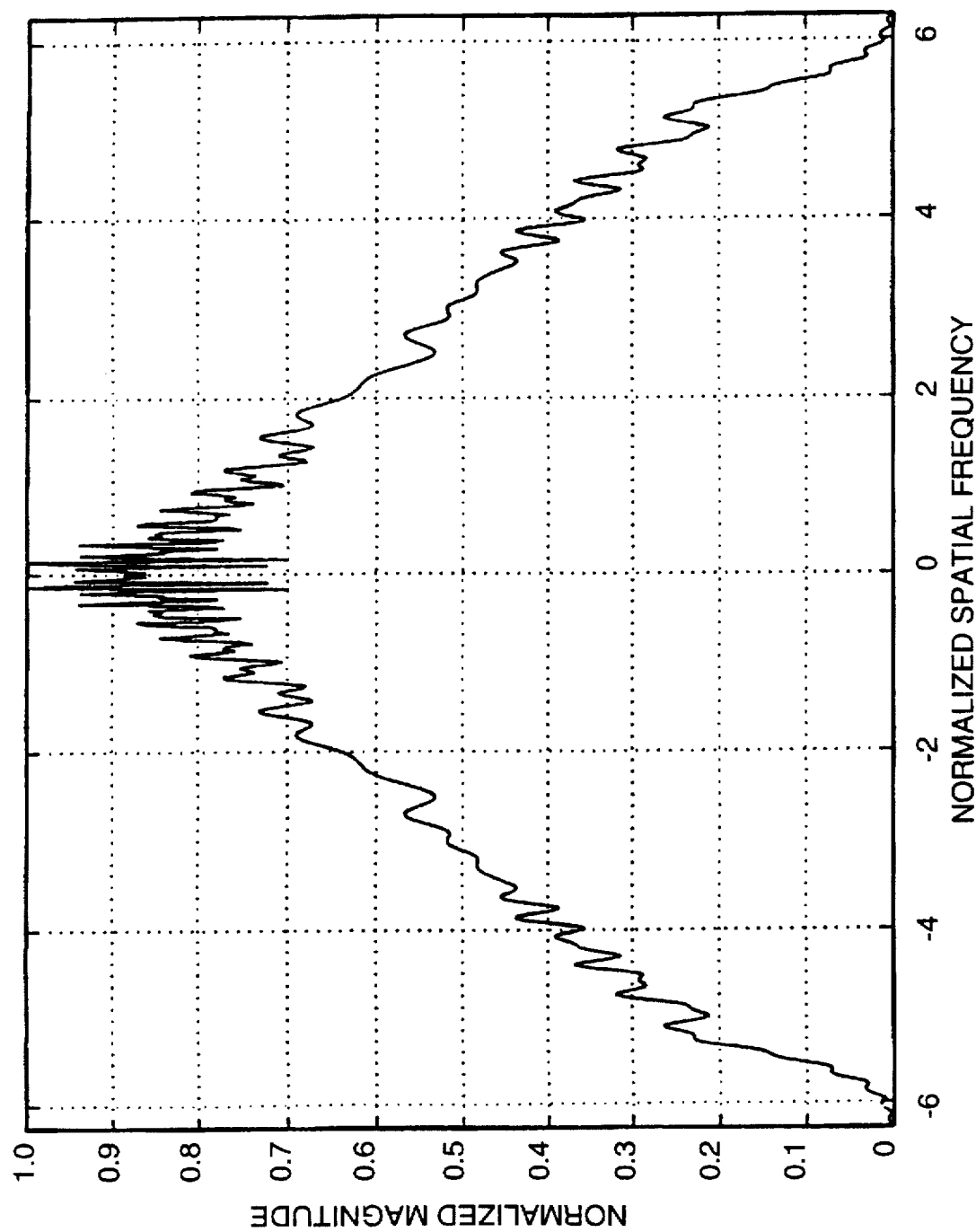
FIG. 15 shows the OTF of the C-PM system of FIG. 2 with large misfocus (after processing).

FIG. 14 shows the magnitude of the OTF of THE C-PM system of FIG. 2 with large misfocus (Ψ=3), before filtering. FIG. 15 shows the magnitude of the OTF of the entire C-PM system. Notice that it is the fact that the OTFs before processing in all three cases (no misfocus, mild misfocus, and large misfocus) are almost the same that allows the same post-processing, or filter, to restore the OTF to near ideal.

Note that while the OTF of the FIG. 2 C-PM system is nearly constant for the three values of misfocus, it does not resemble the ideal OTF of FIG. 10. Thus, it is desirable that the effect of the FIG. 3 mask (other than the increased depth of field) be removed by post-processing before a sharp image is obtained. The effect of the mask may be removed in a variety of ways. In the preferred embodiment, the function implemented by post-processor (preferably a digital signal processing algorithm in a special purpose electronic chip, but also possible with a digital computer or an electronic or optical analog processor) is the inverse of the OTF (approximated as the function H(u), which is constant over Ψ). Thus, the post-processor 35 must, in general, implement the function:

$$\sqrt{\frac{3|\alpha u|}{\pi}} \; e^{j\frac{\alpha u^3}{4}}$$

Figure 16:
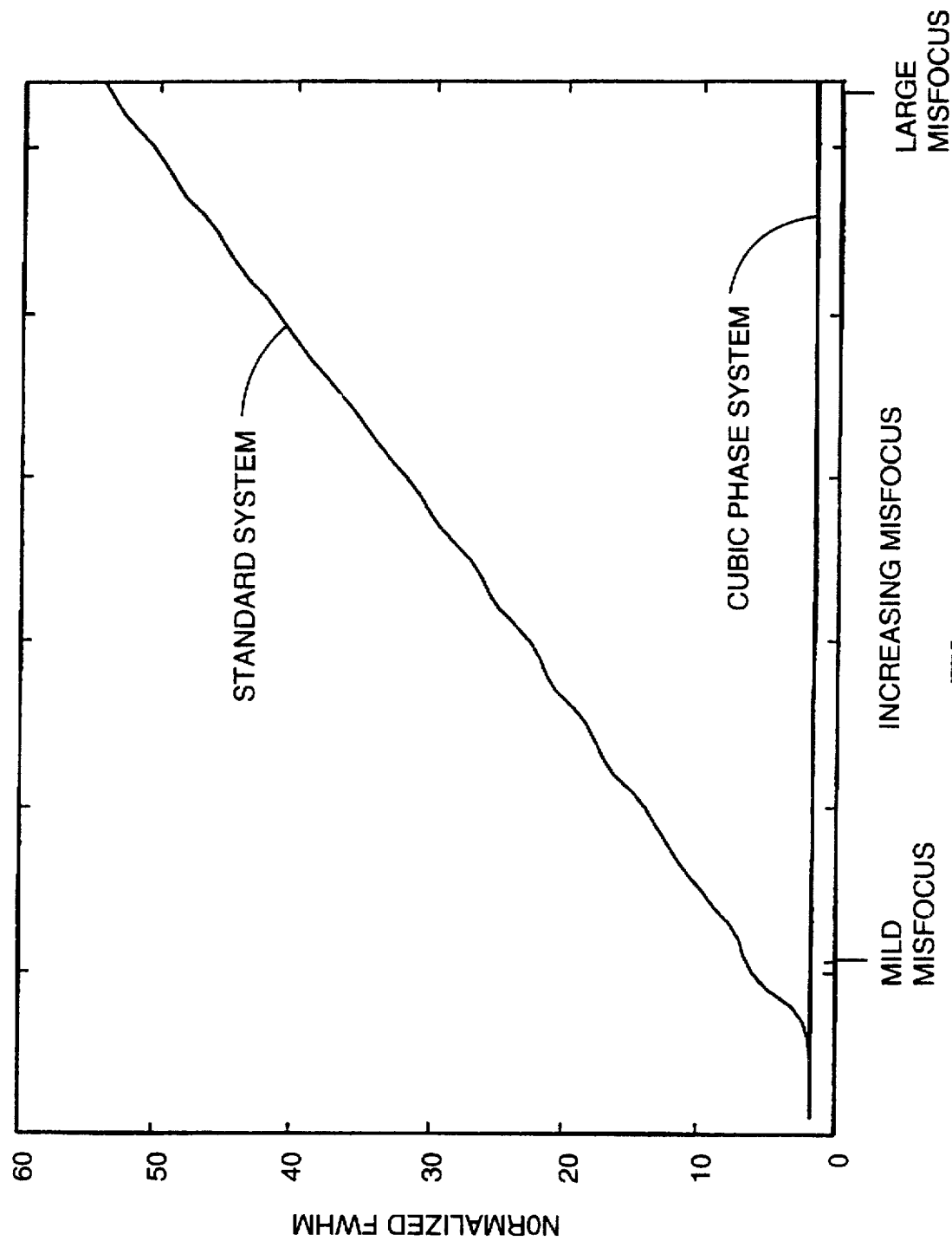
FIG. 16 shows a plot of the Full Width at Half Maximum (FWHM) of the point spread function (PSF) as misfocus increases, for the standard system of FIG. 1 and the C-PM EDF system of FIG. 2.

FIGS. 16–23 show the Point Spread Functions (PSFs) for the standard system of FIG. 1 and the C-PM system of FIG. 2 for varying amounts of misfocus. FIG. 16 shows a plot of normalized Full Width at Half Maximum amplitude (FWHM) of the point spread functions versus misfocus for the two systems. The FWHM barely changes for the FIG. 2 C-PM system, but rises rapidly for the FIG. 1 standard system.

Figure 17:
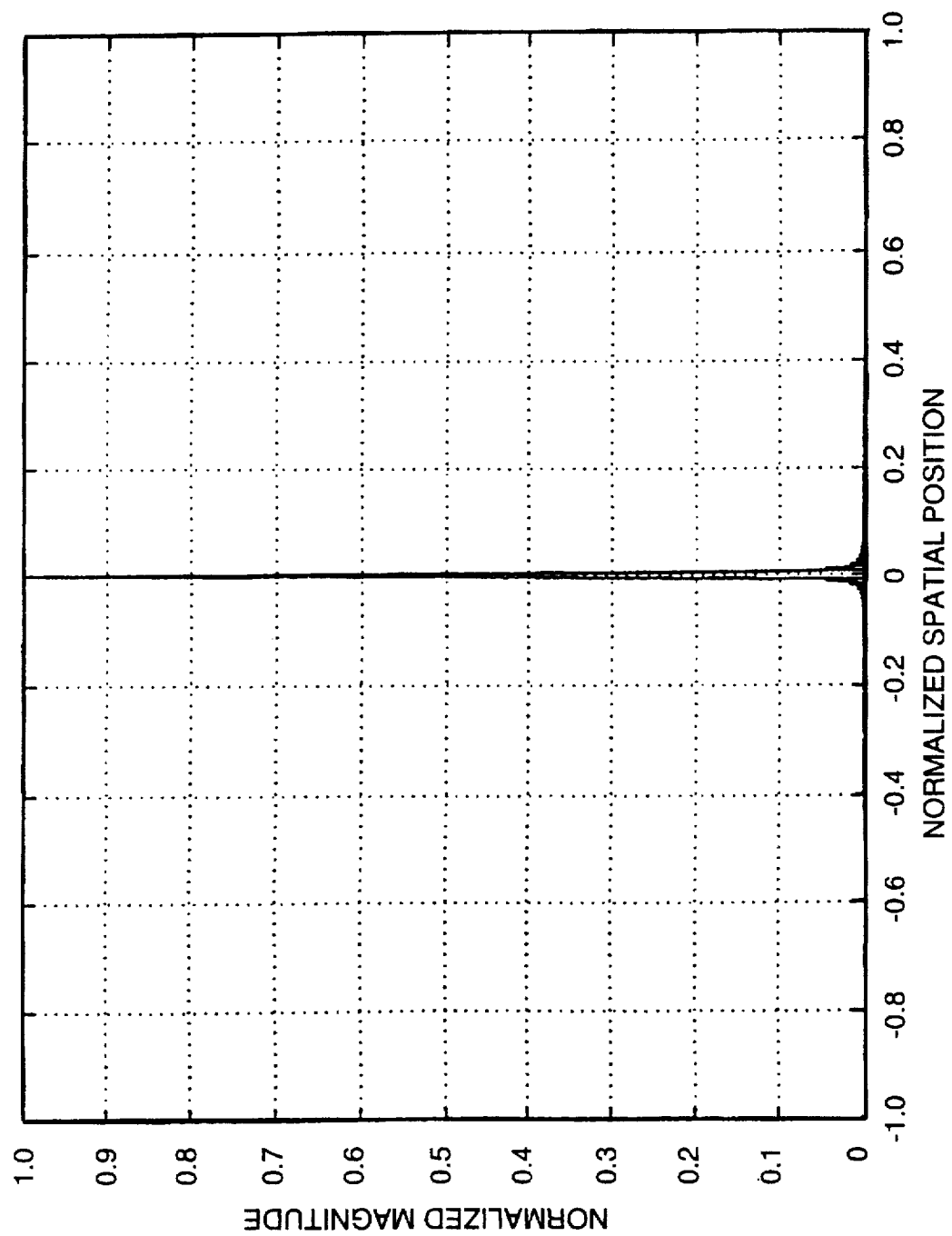
FIG. 17 shows the PSF of the standard imaging system of FIG. 1 with no misfocus.
Figure 18:
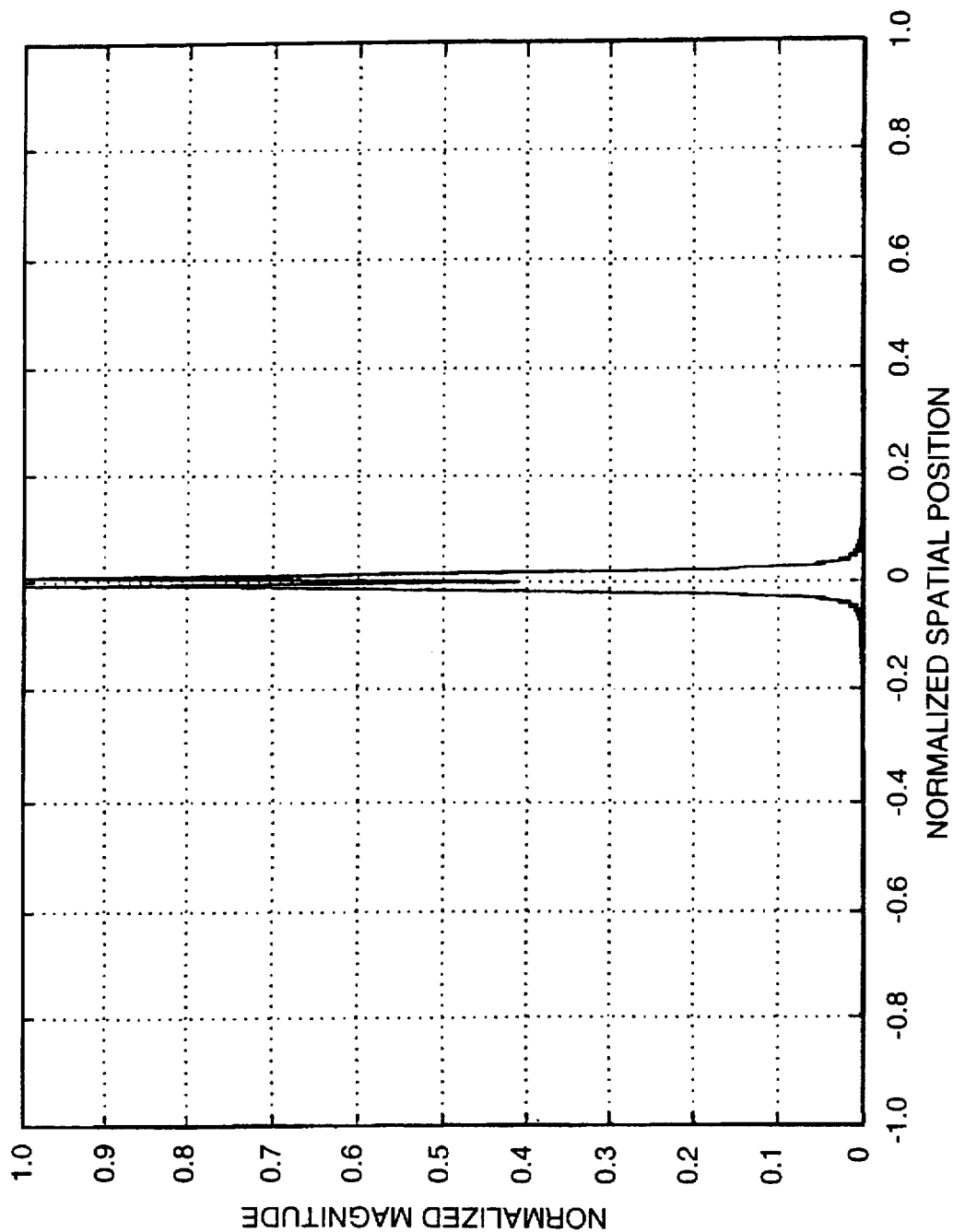
FIG. 18 shows the PSF of the standard system of FIG. 1 with mild misfocus.
Figure 19:
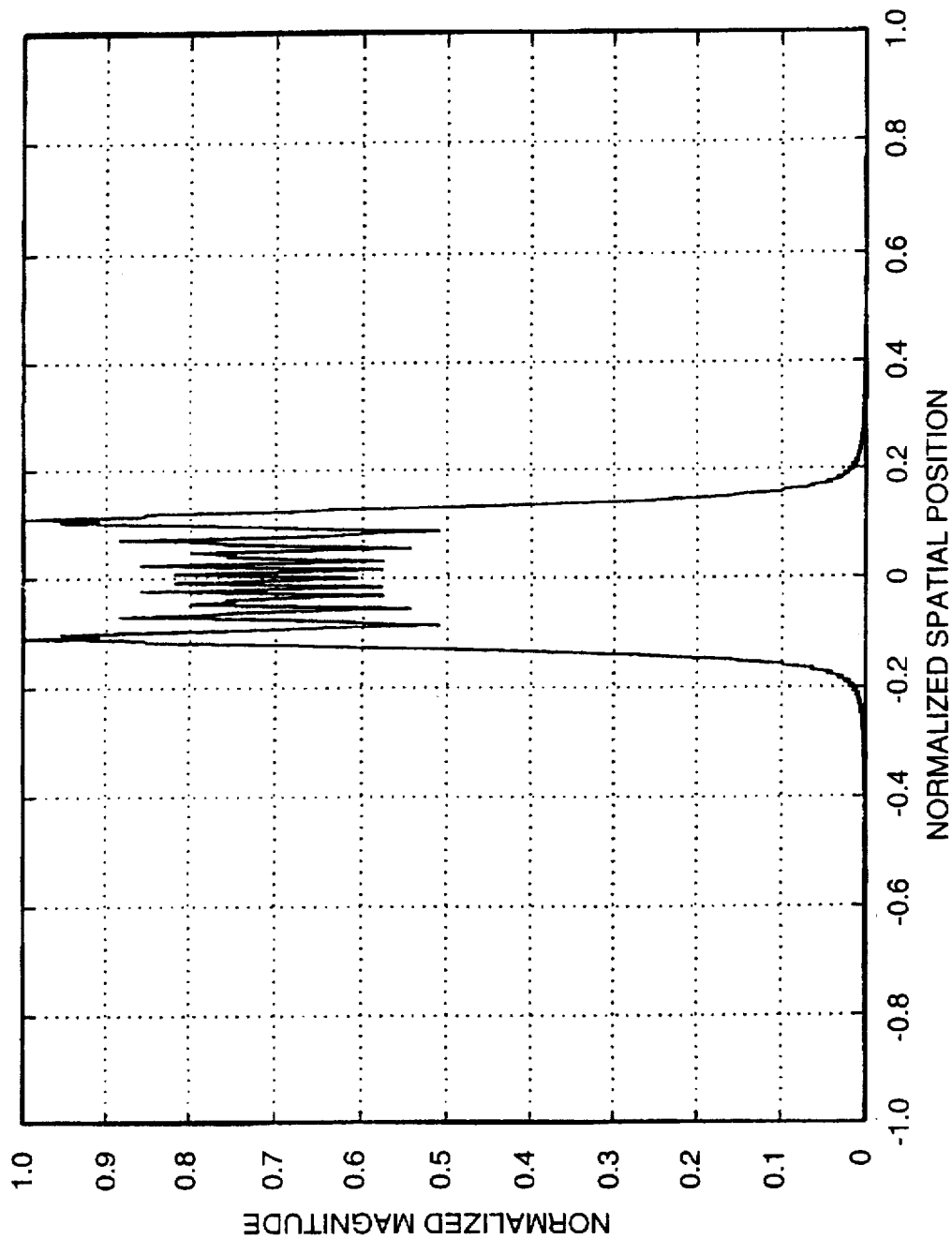
FIG. 19 shows the PSF of the standard system of FIG. 1 with large misfocus.

FIGS. 17, 18, and 19 show the PSFs associated with the FIG. 1 standard system for misfocus values of 0, 0.5, and 3, (no misfocus, mild misfocus, and large misfocus) respectively. The PSF changes dramatically even for mild misfocus, and is entirely unacceptable for large misfocus.

Figure 20:
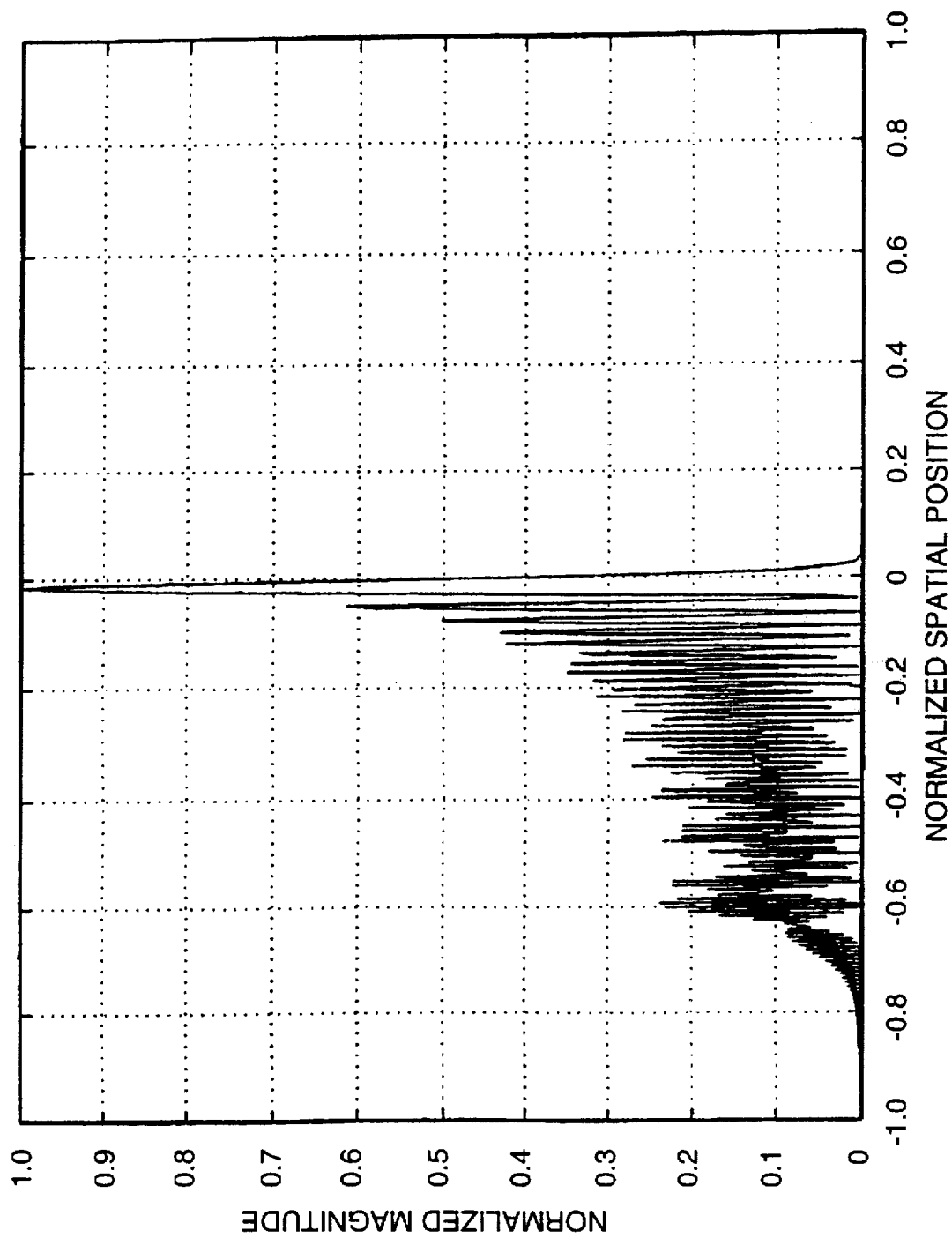
FIG. 20 shows the PSF of the C-PM system of FIG. 2 with no misfocus, before digital processing.
Figure 21:
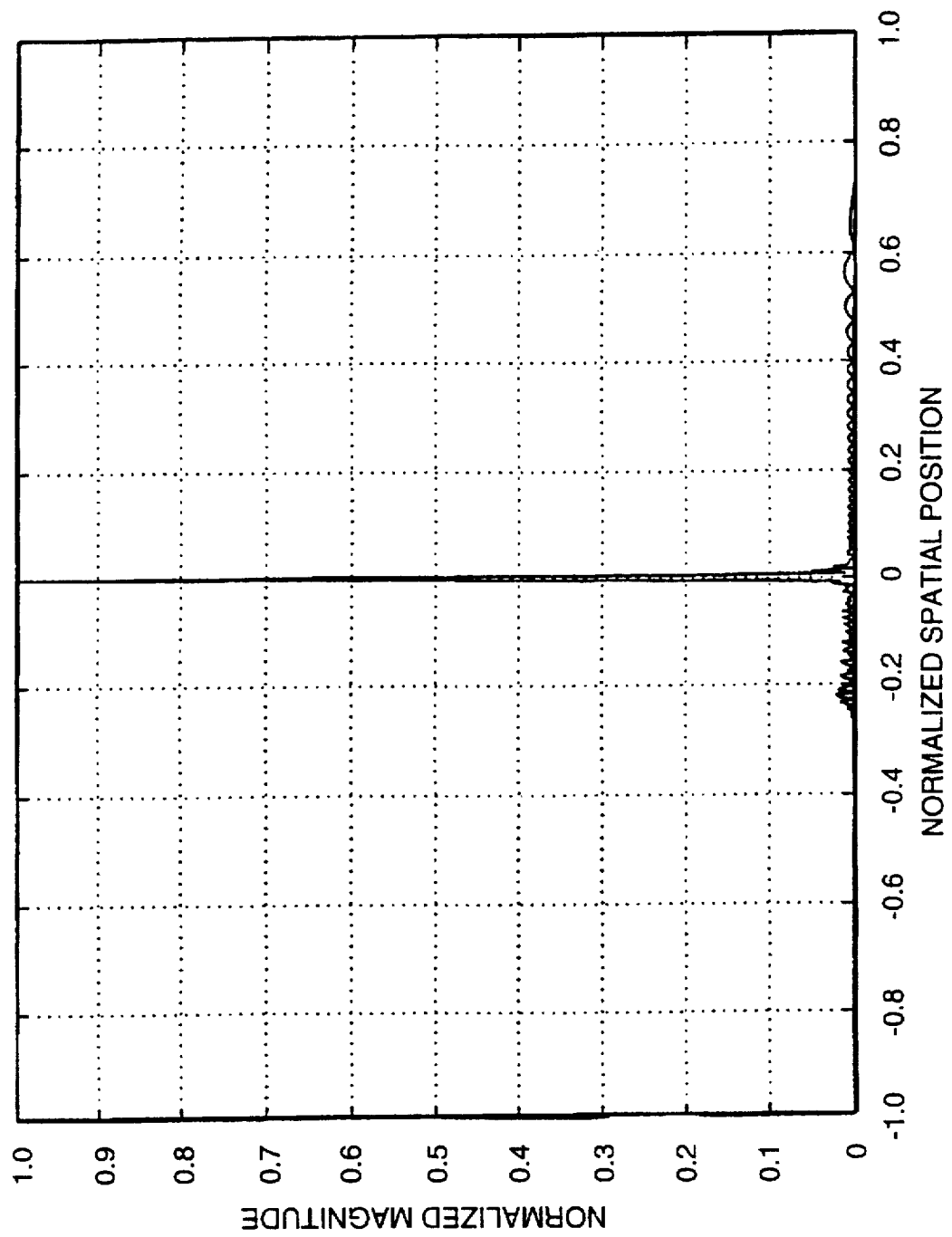
FIG. 21 shows the PSF of the C-PM system of FIG. 2 with no misfocus after processing.
Figure 22:
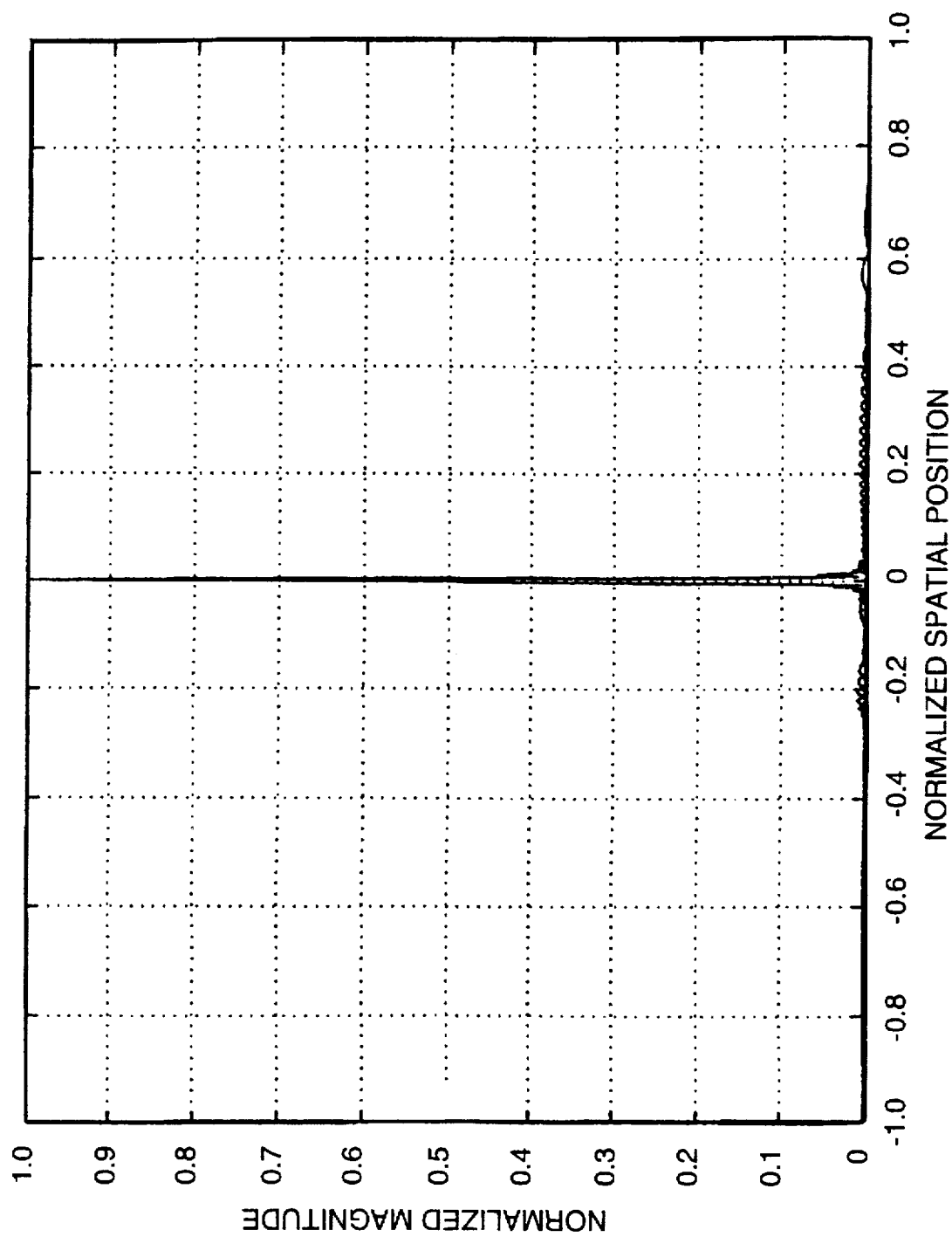
FIG. 22 shows the PSF of the C-PM system of FIG. 2 with small misfocus after processing.
Figure 23:
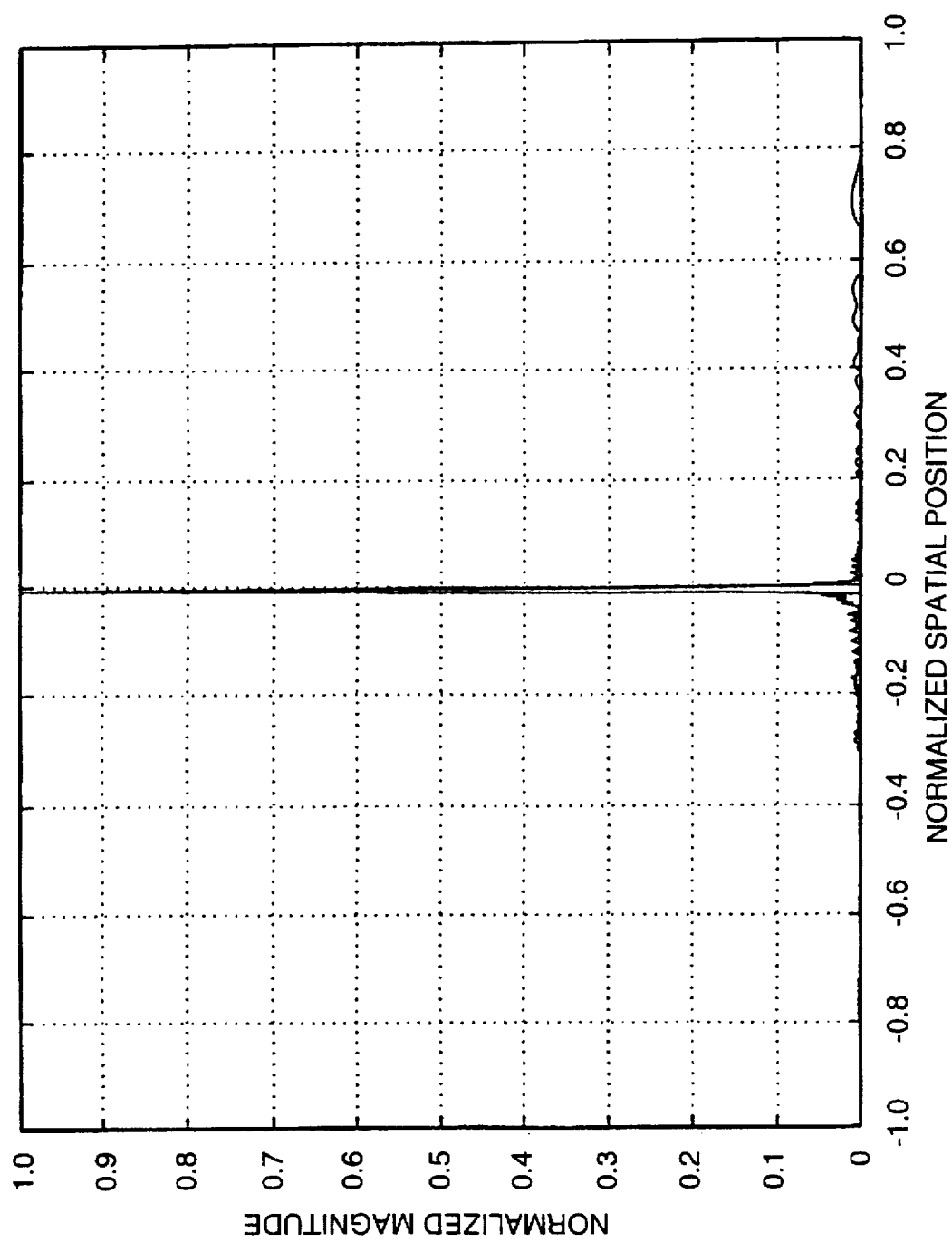
FIG. 23 shows the PSF of the C-PM system of FIG. 2 with large misfocus after processing.

FIG. 20 shows the PSF for the FIG. 2 C-PM system with no misfocus, before filtering (post-processing). It does not look at all like the ideal PSF of FIG. 17, but again, the PSF after filtering, shown in FIG. 21 does. The PSFs of the FIG. 2 C-PM system for mild misfocus is shown in FIG. 22, and the PSF for the FIG. 2 C-PM system with large misfocus is shown in FIG. 23. All three PSFs from the entire system are nearly indistinguishable from each other and from FIG. 17.

Figure 24:
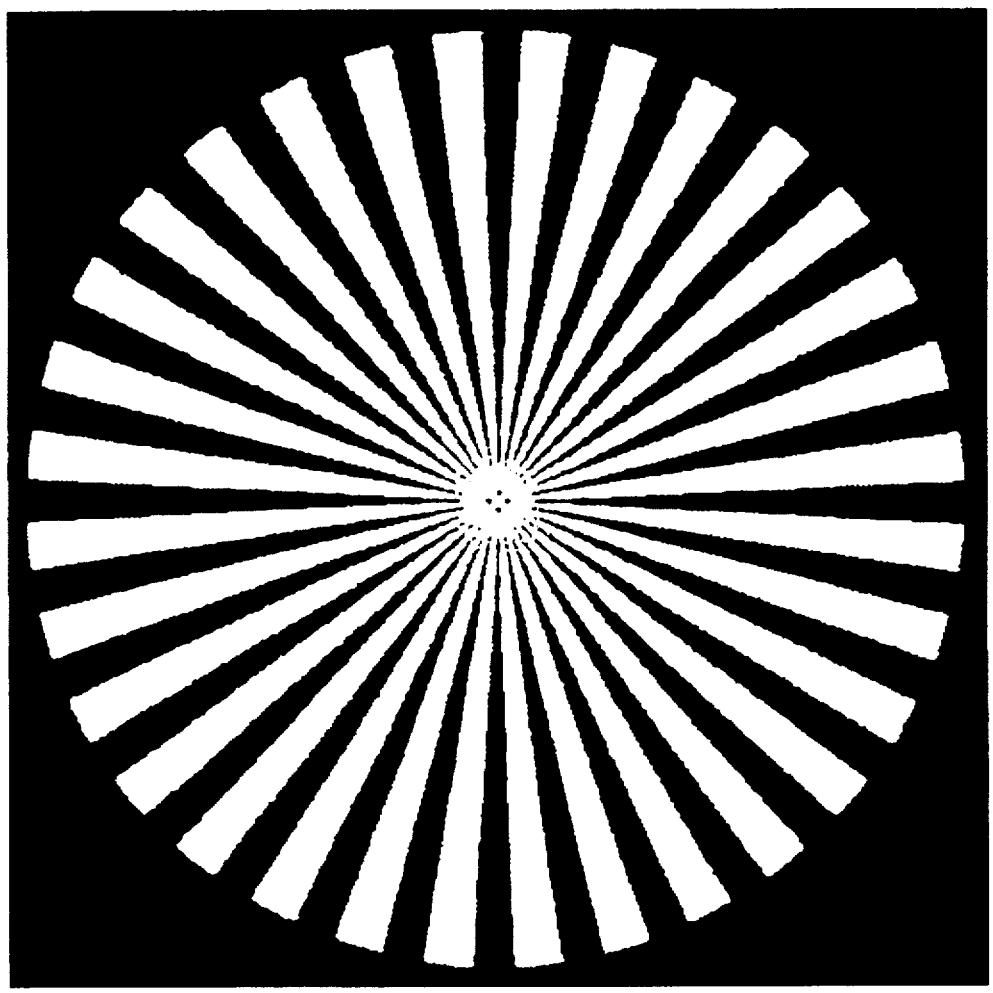
FIG. 24 shows a spoke image from the standard system of FIG. 1 with no misfocus.
Figure 25:
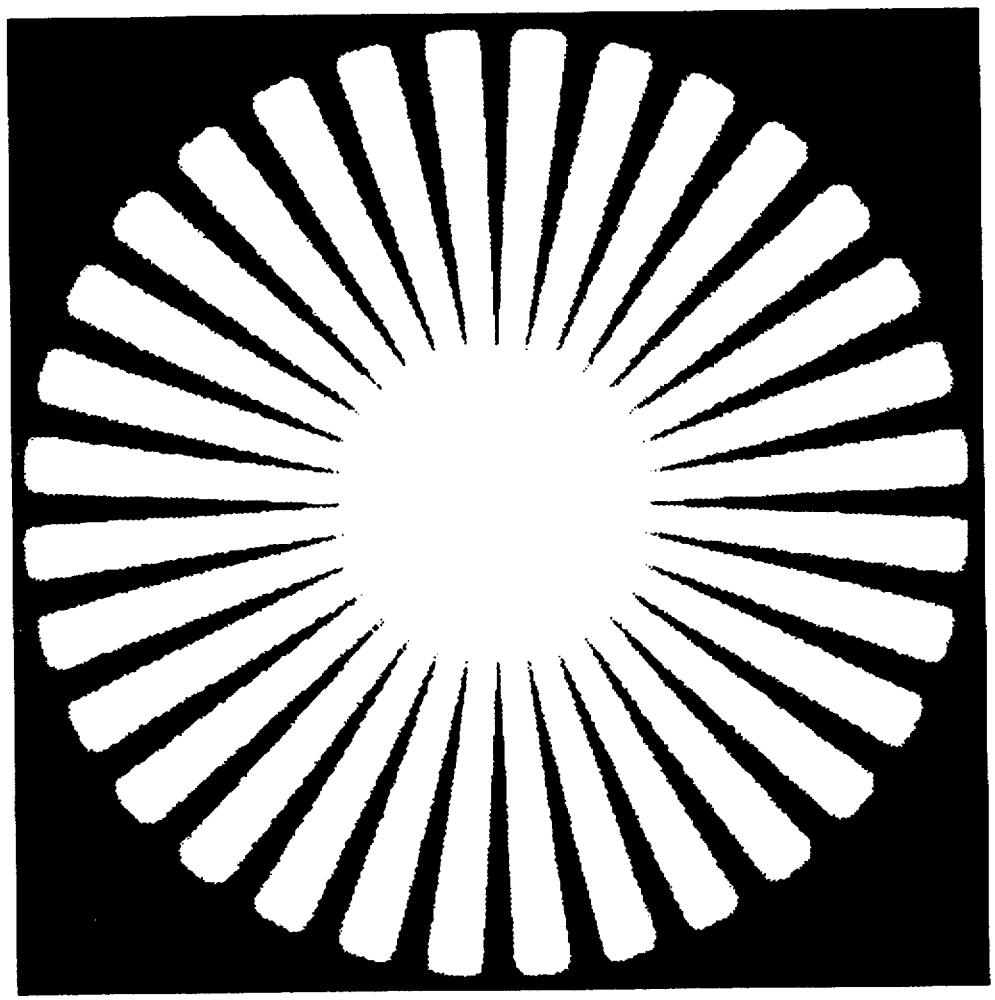
FIG. 25 shows a spoke image from the standard system of FIG. 1, with mild misfocus.

FIG. 24 shows an image of a spoke picture formed by the FIG. 1 standard system with no misfocus. FIG. 25 shows an image of the same picture formed by the FIG. 1 standard system with mild misfocus. You can still discern the spokes, but the high frequency central portion of the picture is lost.

Figure 26:
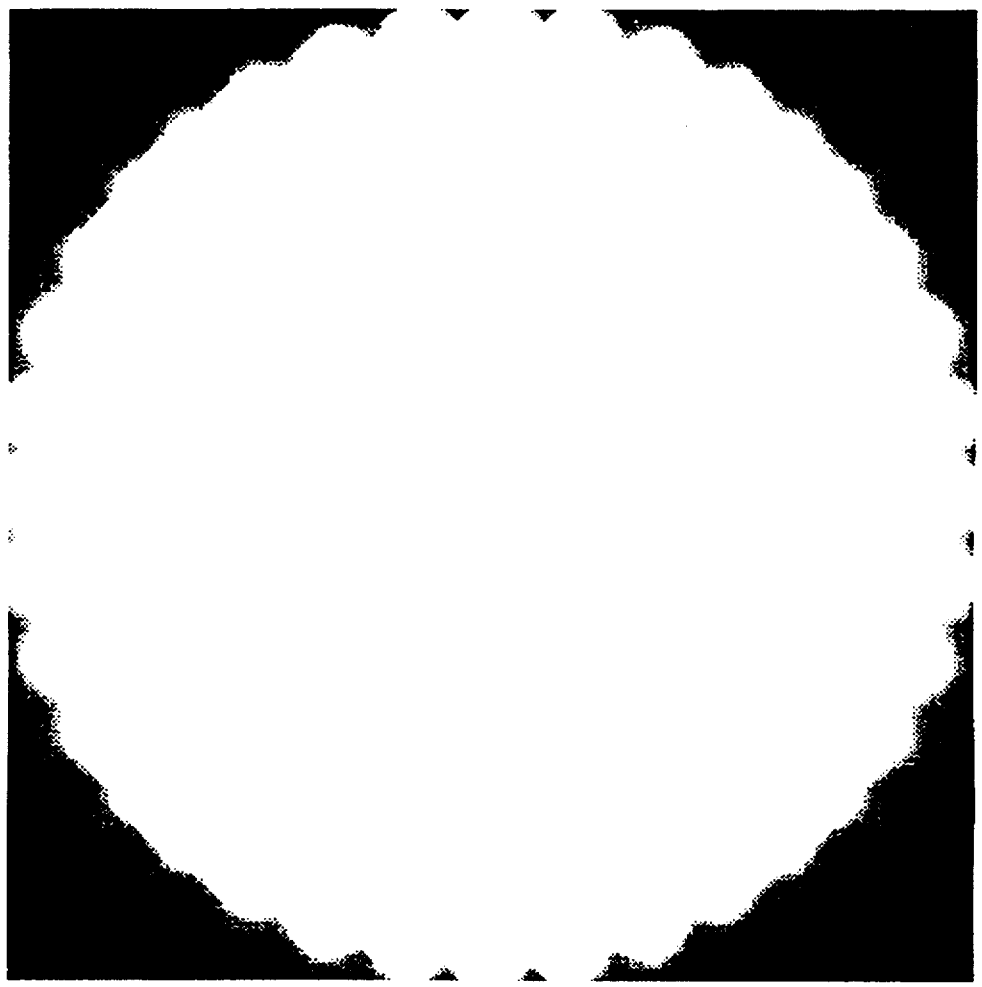
FIG. 26 shows a spoke image from the standard FIG. 1 system, with large misfocus.

FIG. 26 shows the FIG. 1 standard system image formed with large misfocus. Almost no information is carried by the image.

Figure 27:
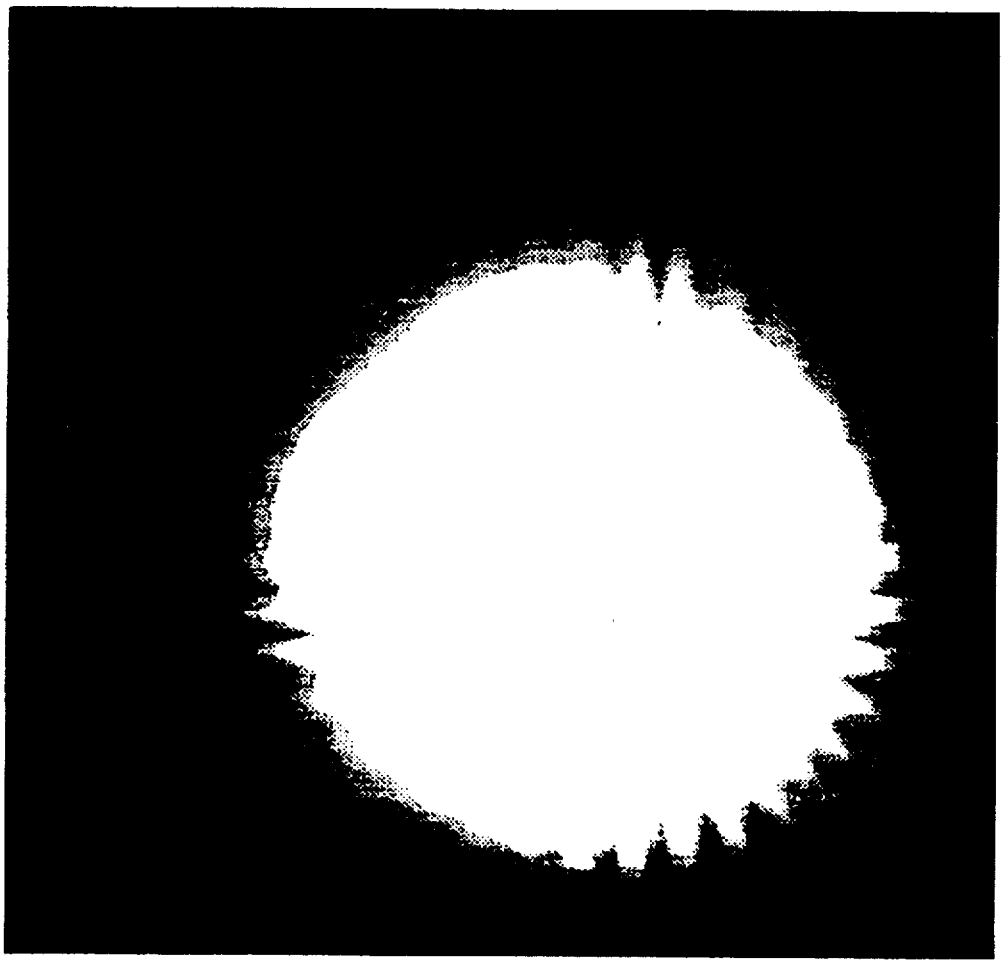
FIG. 27 shows a spoke image from the FIG. 2 C-PM system with no misfocus (before processing).
Figure 28:
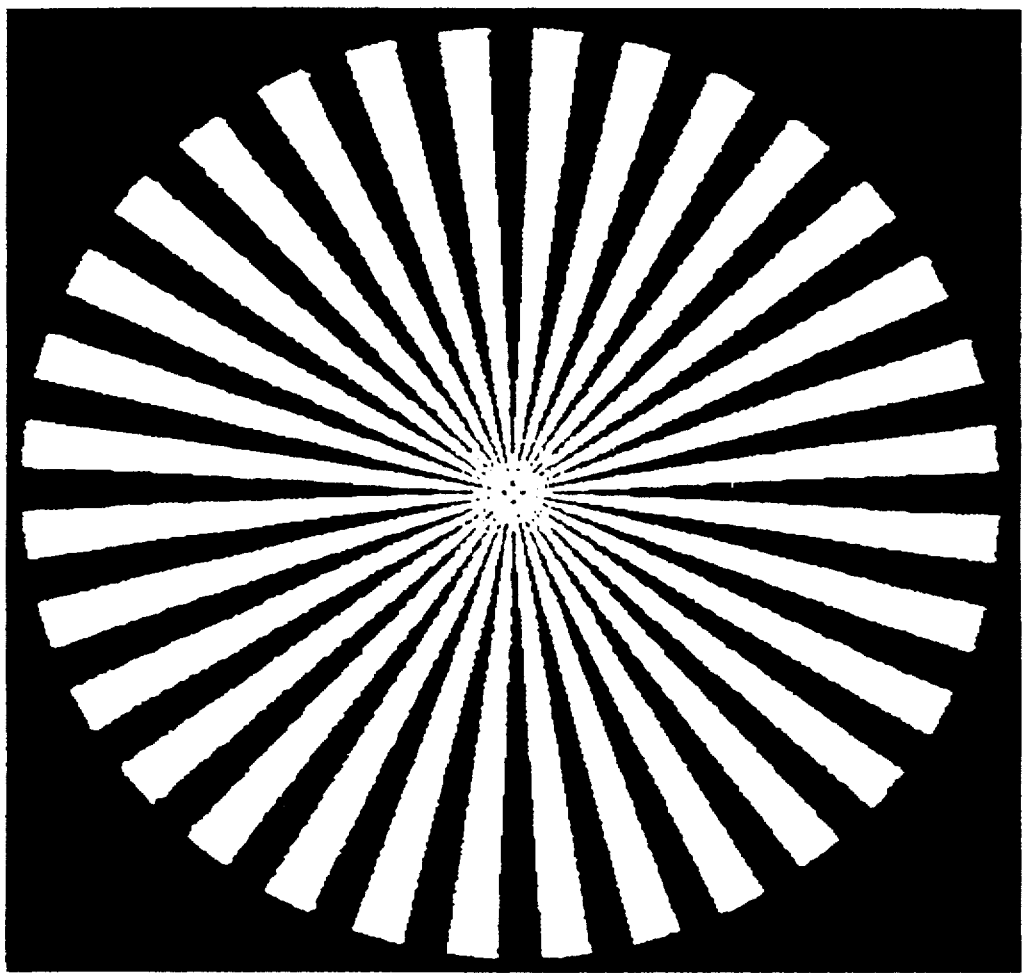
FIG. 28 shows a spoke image from the FIG. 2 C-PM system with no misfocus (after processing).
Figure 29:
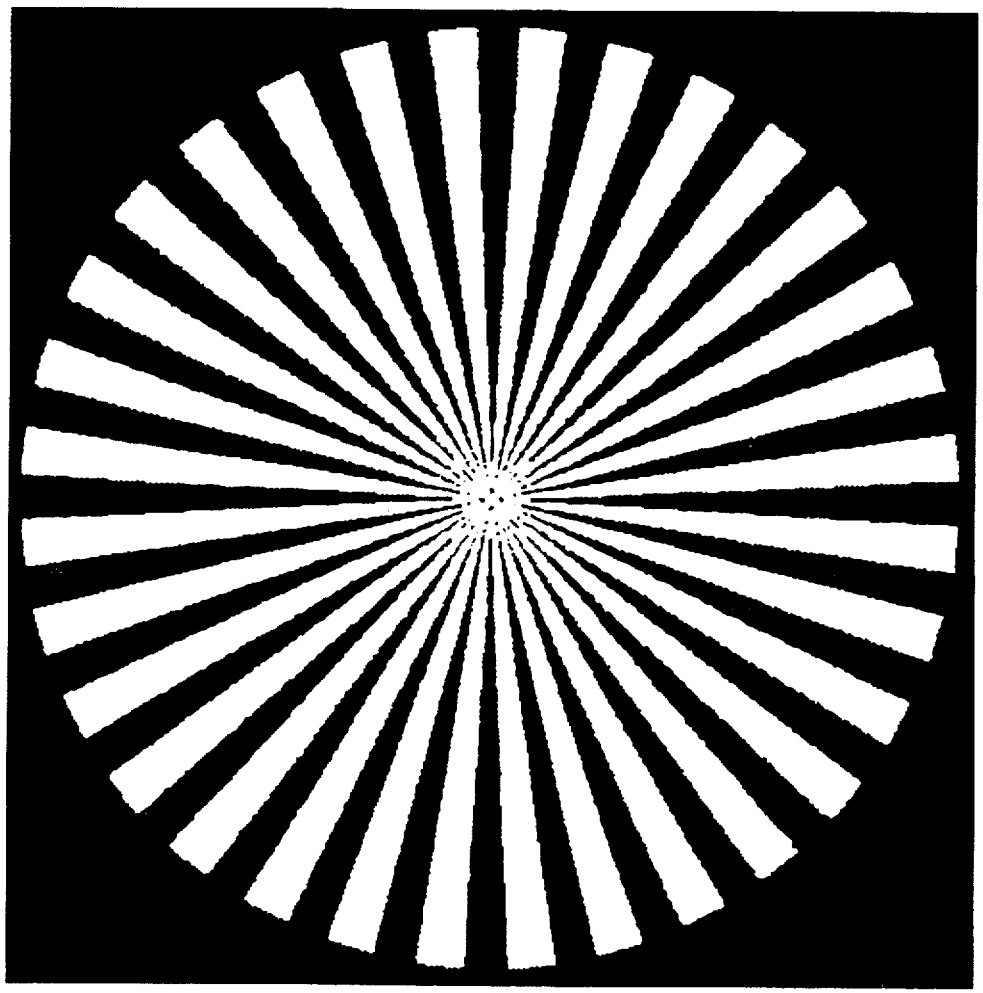
FIG. 29 shows a spoke image from the FIG. 2 C-PM system with mild misfocus (after processing).
Figure 30:
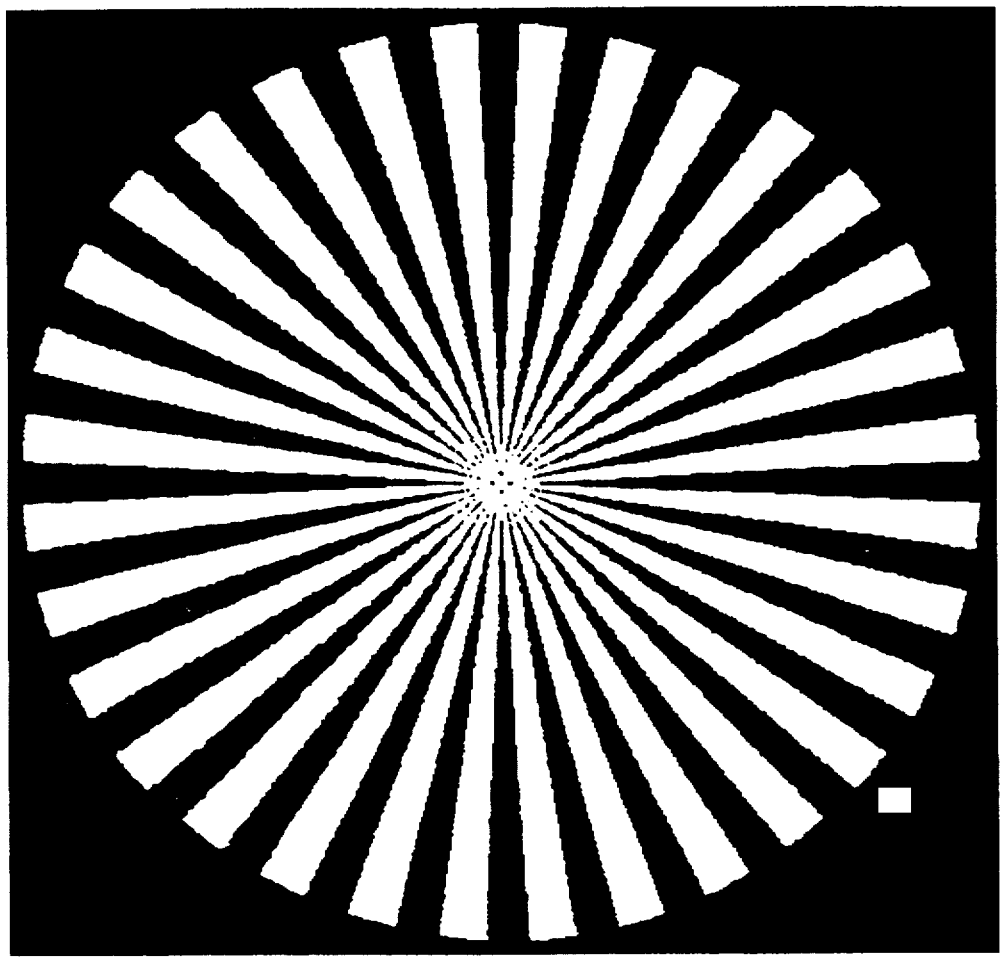
FIG. 30 shows a spoke image from the FIG. 2 C-PM system with large misfocus (after processing).

FIG. 27 is the image of the spoke picture formed by the FIG. 2 C-PM system, before digital processing. The image formed after processing is shown in FIG. 28. The images formed by the complete FIG. 2 system with mild and large misfocus are shown in FIGS. 29 and 30, respectively. Again, they are almost indistinguishable from each other, and from the ideal image of FIG. 24.

Figure 31:
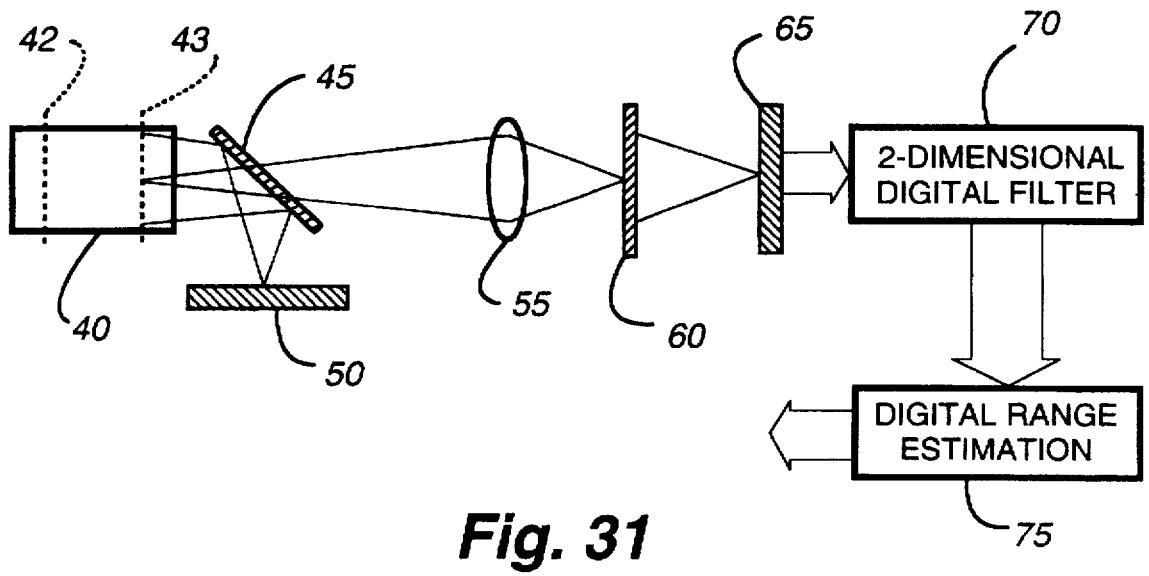
FIG. 31 shows an imaging system according to the present invention which combines extended depth of field capability with passive ranging.

FIG. 31 shows an optical system according to the present invention for extended depth of field passive ranging. Passive ranging using an optical mask is described in U.S. patent application Ser. No. 08/083,829 entitled "Range Estimation Apparatus and Method" by the present inventors, herein incorporated by reference. Application Ser. No. 08/083,829 discusses systems containing range dependent null space, which is equivalent to the range dependent zeroes discussed below.

In FIG. 31, general lens system 40 has front principal plane (or focal plane) 42 and back principal plane 43. Generally, optical mask 60 is placed at or near one of the principal planes, but mask 60 may also be placed at the image of one of the principal planes, as shown in FIG. 31. This allows beam splitter 45 to generate a clear image 50 of the object (not shown). Lens 55 projects an image of back focal plane 43 onto mask 60. Mask 60 is a combined extended depth of field and passive ranging mask. CCD 65 samples the image from mask 60. Digital filter 70 is a fixed digital filter matched to the extended depth of field component of mask 60. Filter 70 returns the PSF of the image to a point as described above. Range estimator 75 estimates the range to various points on the object (not shown) by estimating the period of the range-dependant nulls or zeroes.

Briefly, passive ranging is accomplished by modifying the incoherent optical system of FIG. 2 in such a way that range dependent zeroes are present in the Optical Transfer Function (OTF). Note that the OTF of the EDF system discussed above could not contain zeroes, because the zeroes can not be removed by post filtering to restore the image. In FIG. 31, however, zeroes are added to encode the wavefront with range information. Restoring the image is not important, but finding the object range is. To find the range associated with small specific blocks of the image, the period of zeroes within a block is related to the range to the object imaged within the block. Application Ser. No. 08/083,829 primarily discusses amplitude masks, but phase masks can also produce an OTF with zeroes as a function of object range, and without loss of optical energy. Current passive ranging systems can only operate over a very limited object depth, beyond which it becomes impossible to locate the zeroes, because the OTF main lobe is narrowed, and the ranging zeroes get lost in the OTF lobe zeroes. Extending the depth of field of a passive ranging system makes such a system much more useful.

Consider a general mask 60 for passive ranging described mathematically as:

$$P(x) = \sum_{s=0}^{S-1} \mu_s(x - sT)e^{j\omega_s(x-sT)}, |x| \leq \pi/S$$

$$\mu_s(x) = 0 \text{ for } |x| > \frac{\pi}{s}$$

Figure 32:
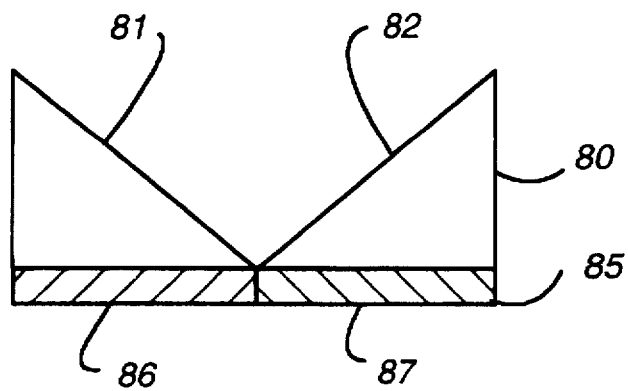
FIG. 32 shows a phase mask for passive ranging.

This mask is composed of S phase modulated elements $\mu_s(x)$ of length T, where $S \cdot T = 2\pi$. Phase modulation of each segment is given by the exponential terms. If the above mask is a phase mask then the segments $\mu_s(x)$, $s=0,1,\ldots,s-1$, satisfy $|\mu_s(x)|=1$. A simple example of this type of mask is shown in FIG. 32. This is a two segment (S=2) phase mask where $\omega_0=-\pi/2$, and $\omega_1=\pi/2$.

FIG. 32 shows an example of a phase passive ranging mask 80, which can be used as mask 60 of FIG. 31. This mask is called a Linear Phase Modulation (LPM) mask because each of the segments modulates phase linearly. Mask 80 comprises two wedges or prisms 81 and 82 with reversed orientation. Without optional filter 85, the formed image is the sum of the left and right components. Optional filter 85 comprises two halves 86 and 87, one under each wedge. Half 86 is orthogonal to half 87, in the sense that light which passes through one half will not pass through the other. For example, the filters could be different colors (such as red and green, green and blue, or blue and red), or could be polarized in perpendicular directions. The purpose of filter 85 is to allow single-lens stereograms to be produced. A stereogram is composed of two images that overlap, with the distance between the same point in each image being determined by the object range to that point.

Figure 33:
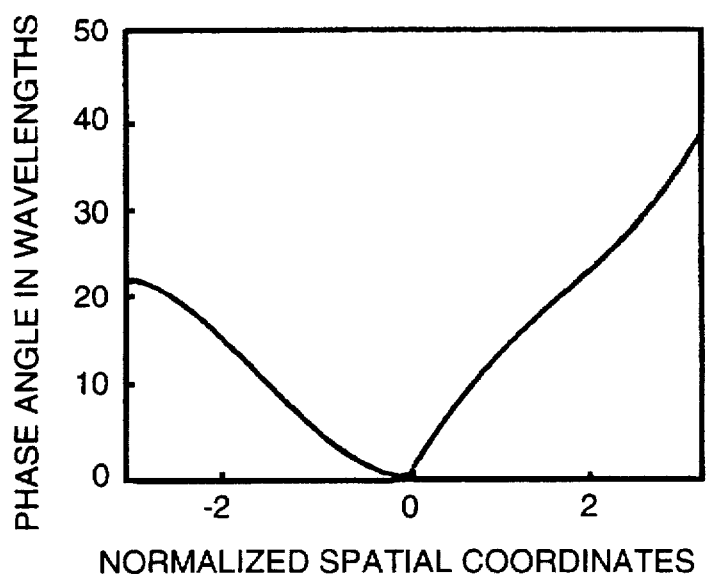
FIG. 33 shows a phase mask for extended depth of field and passive ranging, for use in the device of FIG. 31.

FIG. 33 shows the optical mask function of a combined LPM passive ranging mask and Cubic-PM mask 60 of FIG. 31 which is suitable for passive ranging over a large depth of field. This mask is described by:

$$P(x) = \mu(x)e^{j\alpha x^3}e^{j\omega x} + \mu(x-\pi)e^{j\alpha(x-\pi)^3}e^{j\omega_1(x-\pi)},$$

where $\mu(x)=1$ for $0 \leq x \leq \pi$, 0 otherwise

By using two segments for the LPM component of mask 60, two lobes of the PSF will be produced.

Figure 34:
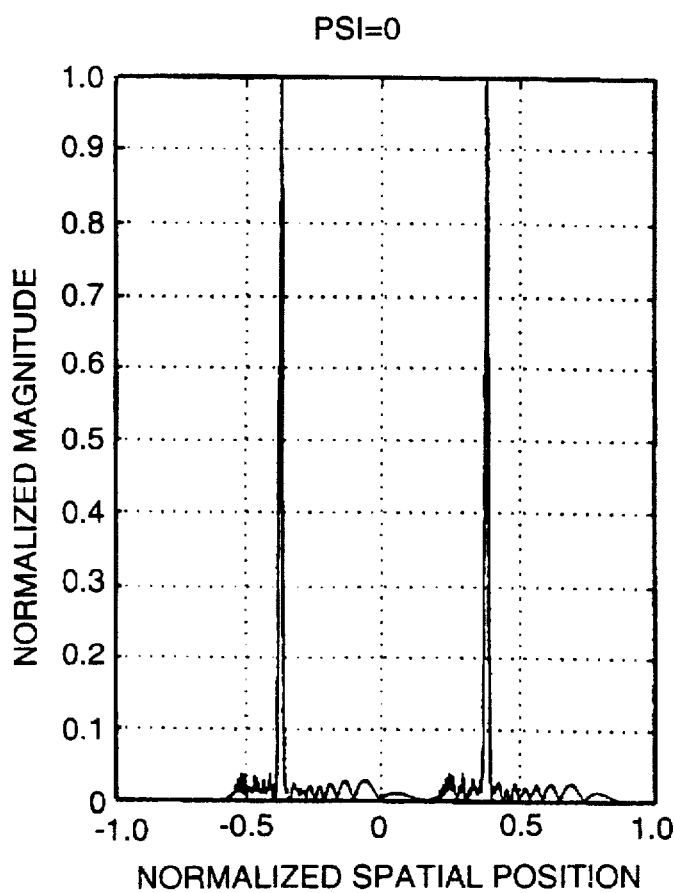
FIG. 34 shows the point spread function of the FIG. 31 embodiment with no misfocus.

The PSF of the imaging system of FIG. 31, using a mask 60 having the FIG. 33 characteristics, with misfocus $\Psi=0$ (no misfocus), is shown in FIG. 34. This system will be called the EDF/PR system, for extended depth of field/passive ranging. The PSF has two peaks because of the two segments of mask 60.

Figure 35:
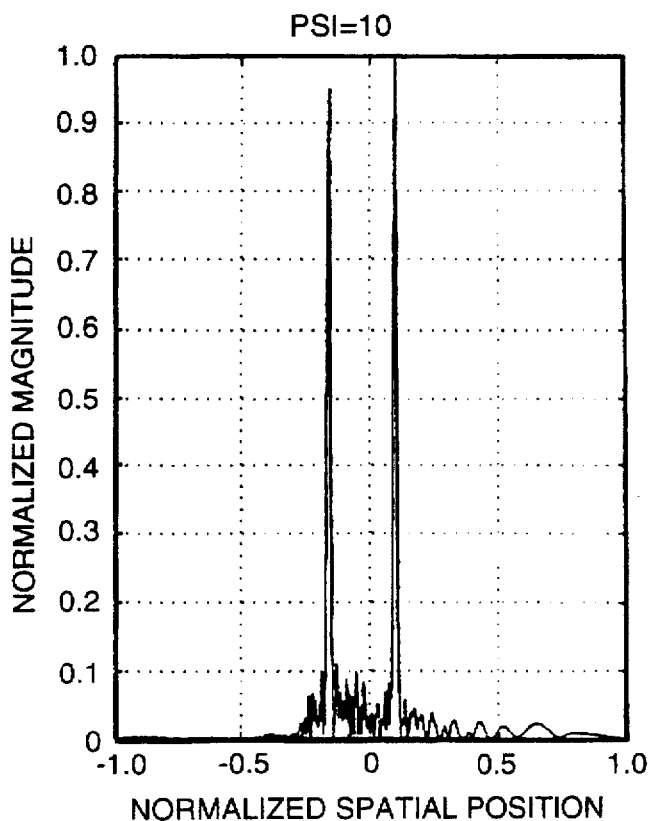
FIG. 35 shows the point spread function of the FIG. 31 embodiment with large positive misfocus.

FIG. 35 shows the PSF of the EDF/PR system with $\Psi=10$. The fact that $\Psi$ is positive indicates that the object is on the far side of the in-focus plane from the lens. The two peaks of the PSF have moved closer together. Thus, it can be seen that the misfocus (or distance from in-focus plane) is related to the distance between the peaks of the PSF. The actual processing done by digital range estimator 75 is, of course, considerably more complicated, since an entire scene is received by estimator 75, and not just the image of a point source. This processing is described in detail in application Ser. No. 08/083,829.

Figure 36:
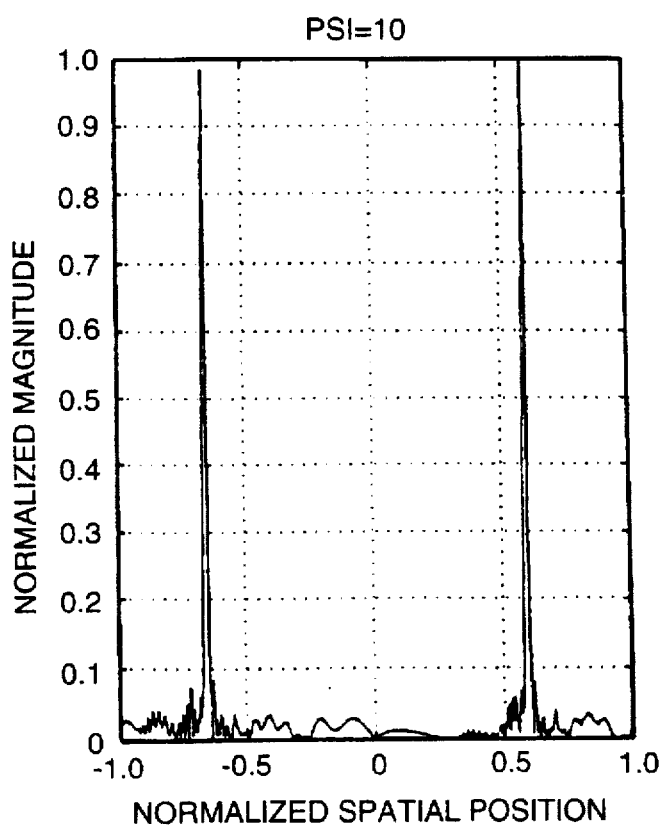
FIG. 36 shows the point spread function of the FIG. 31 embodiment with large negative misfocus.

FIG. 36 shows the PSF of the EDF/PR system with $\Psi=-10$. The fact that $\Psi$ is negative indicates that the object is nearer to the lens than is the in-focus plane The two peaks of the PSF have moved farther apart. This allows estimator 75 to determine not only how far the object is from the in focus plane, but which direction.

It is important to note that while the distance between the peaks of the PSF varies with distance, the peaks themselves remain narrow and sharp because of the EDF portion of mask 60 combined with the operation of digital filter 70.

Figure 37:
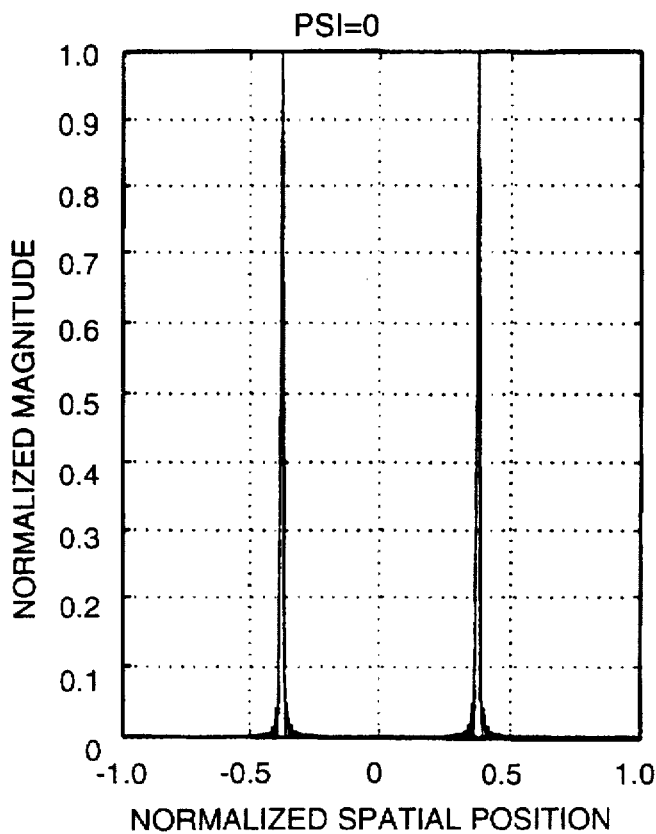
FIG. 37 shows the point spread function of the FIG. 31 embodiment with no extended depth of field capability and no misfocus.
Figure 38:
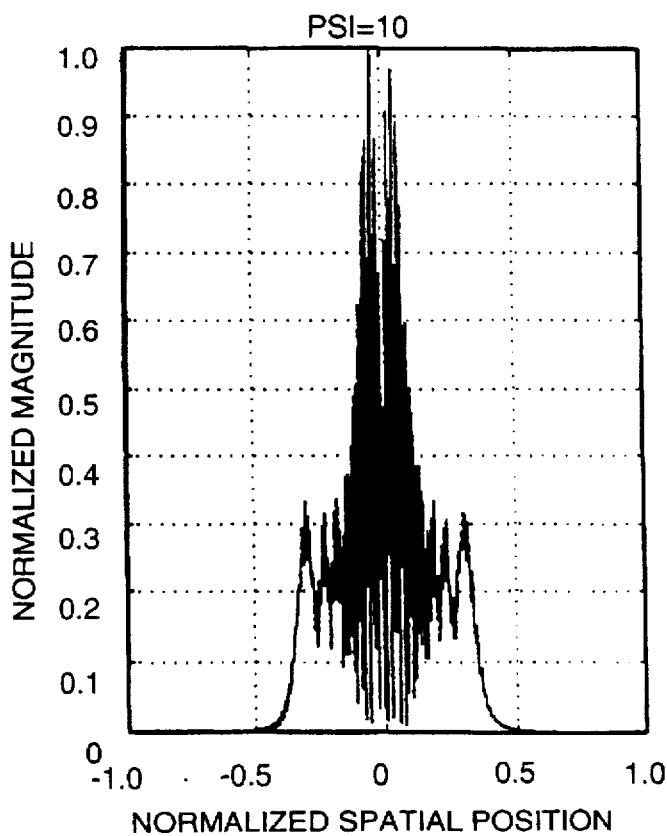
FIG. 38 shows the optical transfer function of the FIG. 31 embodiment with no extended depth of field capability and with large positive misfocus.
Figure 39:
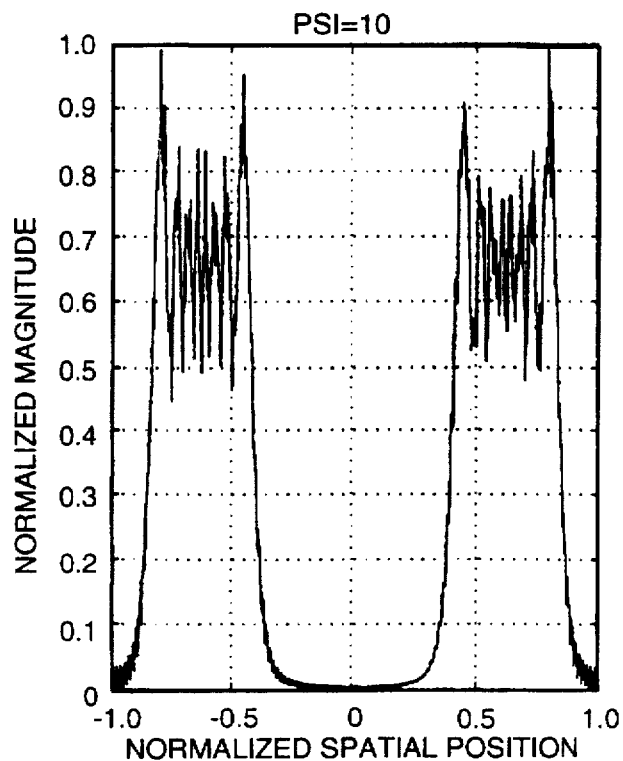
FIG. 39 shows the optical transfer function of the FIG. 31 embodiment with no extended depth of field capability and with large negative misfocus.

FIG. 37 shows the PSF of a system with an LPM mask 80 of FIG. 31, without the EDF portion, and with no misfocus. Since there is no misfocus, FIG. 37 is very similar to FIG. 34. FIG. 38 shows the PSF of mask 80 without EDF and with large positive misfocus ($\Psi=10$). The peaks have moved together, as in FIG. 35. It would be very difficult, however, for any amount of digital processing to determine range from this PSF because the peaks are so broadened. FIG. 39 shows the PSF of mask 80 with no EDF and large negative misfocus ($\Psi=-10$). The peaks have moved apart, but it would be difficult to determine by how much because of the large amount of misfocus.

That is, FIG. 39 shows the PSF of the LPM system without extended depth of field capability and with large negative misfocus ($\Psi=-10$). The peaks have moved further apart, but again it would be very difficult to determine the location of the peaks.

Figure 40:
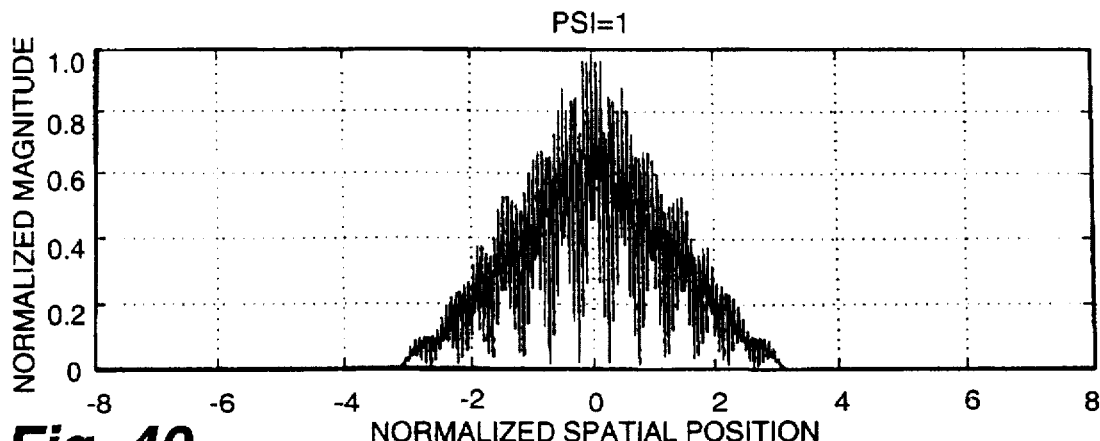
FIG. 40 shows the optical transfer function of the extended depth of field passive ranging system of FIG. 31 with a small amount of misfocus.

FIG. 40 shows the optical transfer function of the combined EDF and LPM system shown in FIG. 31, with a small amount of misfocus ($\Psi=1$). The envelope of the OTF is essentially the triangle of the perfect system (shown in FIG. 6). The function added to the OTF by the ranging portion of the mask of FIG. 33 includes range dependent zeroes, or minima. The digital processing looks for these zeroes to determine the range to different points in the object.

Figure 41:
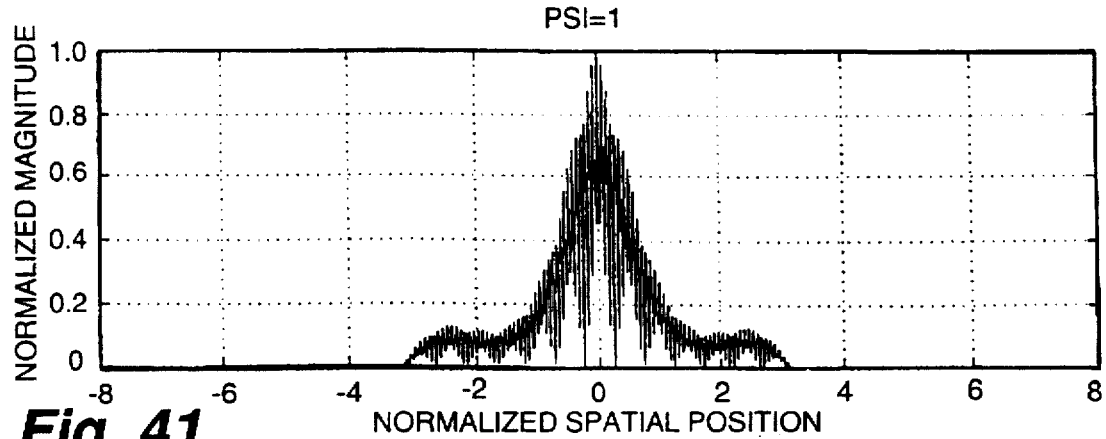
FIG. 41 shows the optical transfer function of a passive ranging system without extended depth of field capability and with a small amount of misfocus.

FIG. 41 shows the optical transfer function of the FIG. 31 embodiment with no extended depth of field capability and small misfocus ($\Psi=1$). The envelope has moved from being the ideal triangle (shown in FIG. 6) to having a narrowed central lobe with side lobes. It is still possible to distinguish the range dependent zeroes, but it is becoming more difficult, because of the low value of the envelope between the main lobe and the side lobes. As the misfocus increases, the main lobe narrows and the envelope has low values over a larger area. The range-dependant minima and zeroes tend to blend in with the envelope zeroes to the extent that digital processing 70, 75 cannot reliably distinguish them.

While the exemplary preferred embodiments of the present invention are described herein with particularity, those having normal skill in the art will recognize various changes, modifications, additions and applications other than those specifically mentioned herein without departing from the spirit of this invention.

What is claimed is:

1. Apparatus for increasing the depth of field of an optical system that processes incoherent light, said optical system having an optical transfer function, said optical system having a lens for focusing incoherent light that is received from an object into an image plane, and having storing means for storing an electrical representation of the light image that is incident at said image plane, said apparatus comprising:

an optical phase mask positioned between the object and the storing means, said mask comprising at least a depth of field increasing feature, constructed and arranged to alter the optical transfer function of the optical system in such a way that the altered optical transfer function is substantially insensitive to the unknown distance between the object and the lens over a greater range of object distances than was provided by the unaltered optical transfer function, said mask operating to affect the phase of light that is transmitted by said mask, while having little or no effect on the intensity of light that is transmitted by said mask, and said mask depth of field increasing feature providing an altered optical transfer function that does not contain zeros within at least one bandwidth of the incoherent light, and depth of field post-processing means connected to the storing means for restoring the stored electrical representation of the light image by reversing the alteration of the optical transfer function accomplished by the mask.

2. The apparatus of claim 1 wherein the post-processing means implements a filter which is the inverse of the alteration of the optical transfer function accomplished by the mask.

3. The apparatus of claim 1 wherein the mask is located at a principal plane of the optical system between the object and the storing means.

4. The apparatus of claim 1 wherein the mask is located at the image of a principal plane of the optical system.

5. The apparatus of claim 1 wherein the optical mask is a cubic phase modulation mask.

6. The apparatus of claim 1 wherein the mask further comprises a passive ranging feature that additionally encodes distance information into the electrical representation of the light image by further modifying the optical system such that the optical transfer function is further modified to contain zeros as a function of the range to points within the object, said apparatus further including:

range post-processing means connected to the depth of field post-processing means and responsive to said zeros in said further modified optical transfer function for decoding distance information encoded into the electrical representation of the light image, and for computing the range to at least one point within the object.

7. The apparatus of claim 6 wherein the mask is a combined cubic phase modulation and linear phase modulation mask.

8. The apparatus of claim 1 wherein the storage means comprises a charge coupled device.

9. The apparatus of claim 1 wherein the storage means comprises film.

10. The apparatus of claim 1 wherein the storage means comprises a video camera.

11. The apparatus of claim 1 wherein the post-processing means comprises a digital filter.

12. A method for increasing the depth of field of an optical system that processes incoherent light, said optical system having an optical transfer function, said optical system having a lens for focusing incoherent light that is received from an object into an image plane, and having storing means for storing an electrical representation of the light that is incident at said image plane, said method comprising the steps of:

constructing an optical phase mask which comprises at least a depth of field increasing feature and which alters the optical transfer function of the optical system such that the altered optical transfer function is substantially insensitive to the unknown distance between the object and the lens over a greater range of object distances than was provided by the unaltered optical transfer function;

said mask operating to affect the phase of light that is transmitted by said mask, while having little or no effect on the intensity of light that is transmitted by said mask, and said mask depth of field increasing feature providing an altered optical transfer function that does not contain zeros within at least one bandwidth of the incoherent light;

placing said mask between the object and the storing means; and providing depth of field post-processing for processing the stored representation of the incident light image to restore the stored light image by reversing the alteration of the optical transfer function accomplished by the mask.

13. The method of claim 12 wherein the post-processing step implements a filter which is the inverse of the alteration of the optical transfer function accomplished by the mask.

14. The method of claim 12 wherein the placing step locates the mask at a principal plane of the optical system between the object and the storing means.

15. The method of claim 12 wherein the placing step locates the mask at the image of a principal plane of the optical system.

16. The method of claim 12 wherein the constructing step constructs a cubic phase modulation mask.

17. The method of claim 12 wherein:

the constructing step includes the step of
including a passive ranging feature in the mask to also encode distance information into the light image by further modifying the optical system such that the optical transfer function is further modified to contain zeros as a function of the range to points within the object; and including the steps of providing range post-processing of the depth of field post-processed image to decode distance information encoded into the light image, and from said zeros in said further modified optical transfer function, computing the range to at least one point within the object.

18. The method of claim 17 wherein the constructing step constructs a mask which is a combined cubic phase modulation and linear phase modulation mask.

19. Apparatus for increasing the depth of field of an incoherent optical system having an optical transfer function, the optical system having a lens for focussing incoherent light that is received from an object into an image plane, and having storing means for storing a representation of the light image that is incident at the image plane, the apparatus comprising:

an optical mask positioned between the object and the storing means, the mask being constructed and arranged to alter the optical transfer function of the optical system such that the altered optical transfer function is substantially insensitive to the unknown distance between the object and the lens over a greater range of object distances than was provided by the unaltered optical transfer function; and analog filter depth of field post-processing means connected to the storing means for restoring the stored representation of the incident light image by reversing the alteration of the optical transfer function accomplished by the optical mask.

20. A method for increasing the depth of field of an incoherent optical system having an optical transfer function, the optical system having a lens for focussing incoherent light that is received from an object into an image plane, and having storing means for storing a representation of the light that is incident at the image plane, the method comprising the steps of:

constructing an optical mask which alters the optical transfer function of the optical system such that the altered optical transfer function is substantially insensitive to the distance between the object and the lens over a greater range of object distances than was provided by the unaltered optical transfer function, the mask constructing step including examining the ambiguity functions of a plurality of candidate mask functions to determine which particular mask function has an optical transfer function that is closest to constant over a range of object distances, and constructing the optical mask having the mask function of the particular candidate;

placing the optical mask between the object and the storing means; and providing depth of field post-processing of the stored representation of light incident at the image plane, to thereby reverse the alteration of the optical transfer function accomplished by the optical mask.

21. A method of claim 20 wherein said step of providing depth of field post-processing includes digital post-processing of the stored representation of light incident at the image plane.

* * * * *